(12) United States Patent
Magariyachi et al.

(10) Patent No.: US 12,445,794 B2
(45) Date of Patent: Oct. 14, 2025

(54) SIGNAL PROCESSING APPARATUS AND METHOD, ACOUSTIC REPRODUCTION APPARATUS, AND PROGRAM

(71) Applicant: Sony Group Corporation, Tokyo (JP)

(72) Inventors: Tetsu Magariyachi, Kanagawa (JP); Takuma Domae, Kanagawa (JP); Kana Seno, Tokyo (JP)

(73) Assignee: Sony Group Corporation, Tokyo (JP)

( * ) Notice: Subject to any disclaimer, the term of this patent is extended or adjusted under 35 U.S.C. 154(b) by 124 days.

(21) Appl. No.: 17/790,453

(22) PCT Filed: Dec. 24, 2020

(86) PCT No.: PCT/JP2020/048357
§ 371 (c)(1),
(2) Date: Jun. 30, 2022

(87) PCT Pub. No.: WO2021/140929
PCT Pub. Date: Jul. 15, 2021

(65) Prior Publication Data
US 2023/0038945 A1    Feb. 9, 2023

(30) Foreign Application Priority Data
Jan. 7, 2020 (JP) ................. 2020-000678

(51) Int. Cl.
*H04S 7/00* (2006.01)
*H04R 3/00* (2006.01)

(52) U.S. Cl.
CPC ........... *H04S 7/303* (2013.01); *H04S 2400/11* (2013.01); *H04S 2420/01* (2013.01)

(58) Field of Classification Search
None
See application file for complete search history.

(56) References Cited

U.S. PATENT DOCUMENTS

| | | | |
|---|---|---|---|
| 9,591,427 B1* | 3/2017 | Lyren | G06F 3/011 |
| 10,412,529 B1* | 9/2019 | Dantrey | H04S 7/303 |

(Continued)

FOREIGN PATENT DOCUMENTS

| | | |
|---|---|---|
| CN | 101931853 A | 12/2010 |
| CN | 103869968 A | 6/2014 |

(Continued)

OTHER PUBLICATIONS

International Search Report and English translation thereof mailed Mar. 30, 2021 in connection with International Application No. PCT/JP2020/048357.

(Continued)

*Primary Examiner* — Qin Zhu
(74) *Attorney, Agent, or Firm* — Wolf, Greenfield & Sacks, P.C.

(57) ABSTRACT

The present technology relates to a signal processing apparatus and method, an acoustic reproduction apparatus, and a program that can achieve more realistic acoustic presentation. The signal processing apparatus includes an acoustic transfer characteristic convolution processing unit that convolves an acoustic transfer characteristic according to a current position of a presentation destination of a virtual sound source among the acoustic transfer characteristic associated with each position in a space and virtual sound source data of the virtual sound source. The present technology can be applied to an acoustic reproduction system.

20 Claims, 12 Drawing Sheets

(56) References Cited

U.S. PATENT DOCUMENTS

| | | |
|---|---|---|
| 10,425,762 B1 * | 9/2019 | Schissler ................. H04S 7/303 |
| 2009/0214045 A1 | 8/2009 | Fukui |
| 2014/0270182 A1 | 9/2014 | Vilermo |
| 2015/0213362 A1 | 7/2015 | Ohwa et al. |
| 2015/0281867 A1 | 10/2015 | Enamito et al. |
| 2015/0296290 A1 | 10/2015 | Asada |
| 2016/0124588 A1 | 5/2016 | Cotier |
| 2017/0245081 A1 * | 8/2017 | Lyren ...................... G06F 3/013 |
| 2018/0109900 A1 | 4/2018 | Lyren |
| 2018/0249274 A1 * | 8/2018 | Lyren ...................... H04S 7/303 |
| 2018/0367937 A1 * | 12/2018 | Asada ...................... H04R 5/04 |
| 2019/0289414 A1 | 9/2019 | Lyren |
| 2019/0373396 A1 | 12/2019 | Walker |
| 2020/0142664 A1 * | 5/2020 | Dantrey .................. G06F 3/165 |
| 2020/0336858 A1 * | 10/2020 | Brimijoin, II ........... H04R 5/04 |
| 2020/0368616 A1 * | 11/2020 | Delamont ............ H04N 13/239 |
| 2021/0120356 A1 * | 4/2021 | Elby ....................... H04S 5/005 |
| 2022/0060841 A1 * | 2/2022 | Tamaki .................. H04L 67/10 |
| 2023/0396875 A1 * | 12/2023 | Tamaki ................ H04N 23/635 |

FOREIGN PATENT DOCUMENTS

| | | | |
|---|---|---|---|
| EP | 3352481 | A | 7/2018 |
| JP | H03258200 | A | 11/1991 |
| JP | 2010531605 | A | 9/2010 |
| JP | 2015-076797 | A | 4/2015 |
| JP | 2015-198297 | A | 11/2015 |
| JP | 6229655 | B2 | 11/2017 |
| WO | WO 2014/069111 | A1 | 5/2014 |
| WO | WO 2017/061218 | A1 | 4/2017 |

OTHER PUBLICATIONS

Extended European Search Report for European Application No. 20912160.7 dated Apr. 3, 2023.

International Written Opinion and English translation thereof mailed Mar. 30, 2021 in connection with International Application No. PCT/JP2020/048357.

International Preliminary Report on Patentability and English translation thereof mailed Jul. 21, 2022 in connection with International Application No. PCT/JP2020/048357.

* cited by examiner

SIGNAL PROCESSING APPARATUS AND METHOD, ACOUSTIC REPRODUCTION APPARATUS, AND PROGRAM

CROSS-REFERENCE TO RELATED APPLICATIONS

This application claims the benefit under 35 U.S.C. § 371 as a U.S. National Stage Entry of International Application No. PCT/JP2020/048357, filed in the Japanese Patent Office as a Receiving Office on Dec. 24, 2020, which claims priority to Japanese Patent Application Number JP2020-000678, filed in the Japanese Patent Office on Jan. 7, 2020, each of which is hereby incorporated by reference in its entirety.

TECHNICAL FIELD

The present technology relates to a signal processing apparatus and method, an acoustic reproduction apparatus, and a program, and more particularly, to a signal processing apparatus and method, an acoustic reproduction apparatus, and a program that can achieve more realistic acoustic presentation.

BACKGROUND ART

In recent years, many technologies related to an application that uses a user position measured by a global positioning system (GPS) or the like have been proposed.

For example, a technology has been proposed in which an image imaged by a user at a place where the user goes or a comment entered by the user is provided to a server together with a history of the user position, and the server generate course information for introducing a course followed by the user to another user (see, for example, Patent Document 1).

Furthermore, for example, an application that constantly measures the position of the user and presents a predetermined binaural voice when the user comes to a specific position has also been proposed.

CITATION LIST

Patent Document

Patent Document 1: Japanese Patent No. 6229655

SUMMARY OF THE INVENTION

Problems to be Solved by the Invention

In the meantime, in a case of performing acoustic presentation such as reproducing a predetermined voice when the user is at a specific position, every place where the acoustic presentation is performed has a different characteristic such as reverberation, and therefore reality may be impaired.

The present technology has been made in view of such a situation, and an object thereof is to realize more realistic acoustic presentation.

Solutions to Problems

A signal processing apparatus according to a first aspect of the present technology includes an acoustic transfer characteristic convolution processing unit that convolves an acoustic transfer characteristic according to a current position of a presentation destination of a virtual sound source among the acoustic transfer characteristic associated with each position in a space and virtual sound source data of the virtual sound source.

A signal processing method or a program according to the first aspect of the present technology includes a step of convolving an acoustic transfer characteristic according to a current position of a presentation destination of a virtual sound source among the acoustic transfer characteristic associated with each position in a space and virtual sound source data of the virtual sound source.

In the first aspect of the present technology, an acoustic transfer characteristic according to a current position of a presentation destination of a virtual sound source among the acoustic transfer characteristic associated with each position in a space and virtual sound source data of the virtual sound source are convolved.

An acoustic reproduction apparatus according to a second aspect of the present technology includes: a reception unit that receives, from an external apparatus, audio data obtained by convolving an acoustic transfer characteristic according to a current position of a presentation destination of a virtual sound source among the acoustic transfer characteristic associated with each position in a space and virtual sound source data of the virtual sound source; and a reproduction unit that reproduces a sound based on the audio data received by the reception unit.

In the second aspect of the present technology, audio data obtained by convolving an acoustic transfer characteristic according to a current position of a presentation destination of a virtual sound source among the acoustic transfer characteristic associated with each position in a space and virtual sound source data of the virtual sound source is received from an external apparatus, and a sound based on the audio data received by the reception unit is reproduced.

MODE FOR CARRYING OUT THE INVENTION

Embodiments to which the present technology is applied will be explained below with reference to the drawings.

First Embodiment

<Regarding Present Technology>

The present technology is to make it possible to realize acoustic presentation with higher reality by convoluting an acoustic transfer characteristic according to a position of a user with respect to virtual sound source data, in a case where acoustic presentation based on the virtual sound source data is performed for the user according to the position of the user.

For example, in the present technology, for each of a plurality of positions in a predetermined target area, a room impulse response (RIR) for adding sound characteristics such as reverberation around each position and the like are prepared in advance as the acoustic transfer characteristics.

Then, the transfer characteristic position information indicating the respective position and the acoustic transfer characteristic at the respective position are managed in association with each other on the cloud, a predetermined server, or the like.

Here, the target area for which the acoustic transfer characteristics are prepared may be the entire world, a specific area such as Shibuya, or a local area such as a specific movie theater or theme park.

Furthermore, the acoustic transfer characteristic may be prepared for each of a plurality of positions in a three-dimensional space, or may be prepared for each of a plurality of positions in a two-dimensional target area. Moreover, an acoustic transfer characteristic may be prepared for each of the plurality of target areas.

Furthermore, the transfer characteristic position information may be coordinate information indicating a position on various coordinate systems such as a three-dimensional orthogonal coordinate system, or may be latitude and longitude information including latitude and longitude indicating an arbitrary position on the earth surface.

Figure 1:
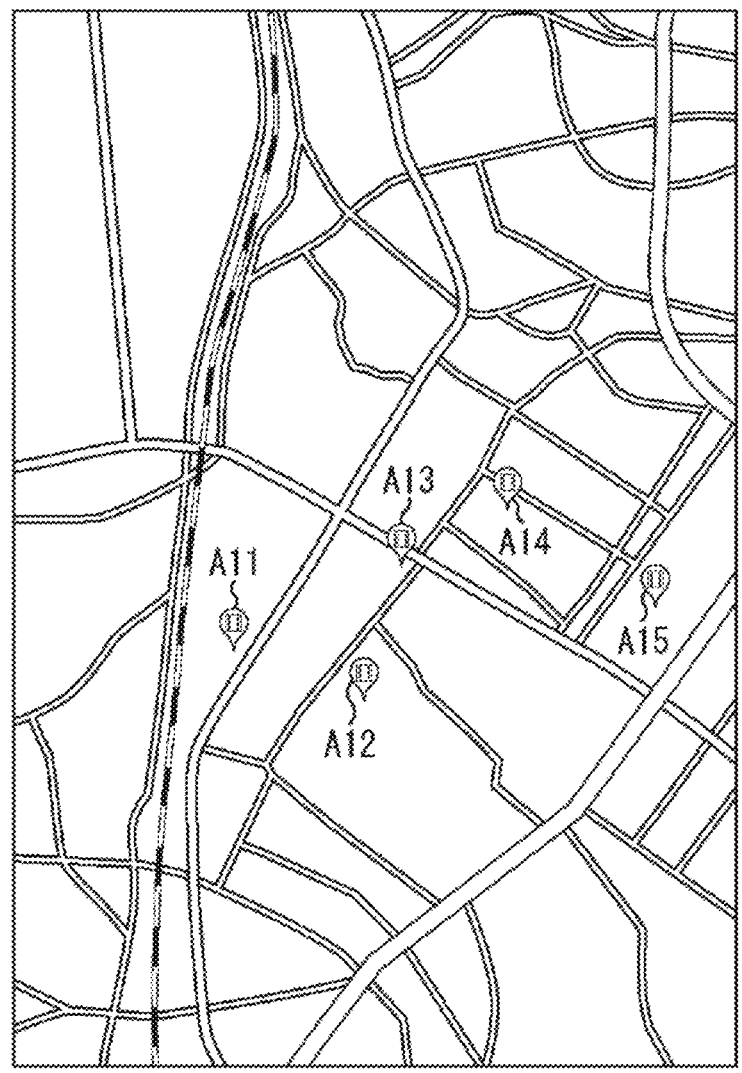
FIG. 1 is a diagram describing an acoustic transfer characteristic at each position in a target area.

In a case where a specific area such as around a station is a target area as illustrated in FIG. 1 for example, the acoustic transfer characteristics can be registered in order from a necessary position in the target area.

In this example, the acoustic transfer characteristics are prepared at a total of five positions A11 to A15 in the target area at the current time point. If the acoustic transfer characteristics at each position are sequentially registered as necessary from such a state, the acoustic transfer characteristics at each position of the entire target area can be used in the end.

If the acoustic transfer characteristic for each position in the target area as described above is managed by a cloud or the like, various users can acquire and use the acoustic transfer characteristics at a desired position from the cloud or the like. In this case, for example, a terminal device or the like carried by the user or the like can acquire and use the acoustic transfer characteristic on the basis of information indicating the position of the user as necessary without holding the acoustic transfer characteristic.

Note that a case where the acoustic transfer characteristic is RIR will be described below as an example, but the acoustic transfer characteristic is not limited to RIR and may be any acoustic transfer characteristic as long as a sound transfer characteristic in a region (space) including a specific position can be added.

Furthermore, in the present technology, only the acoustic transfer characteristic may be convolved with respect to the virtual sound source data, or not only the acoustic transfer characteristic but also the head-related transfer function may be convolved with respect to the virtual sound source data. By also convolving the head-related transfer function with respect to the virtual sound source data, it is possible to perform more realistic acoustic presentation to the user.

In this case, the head-related transfer function may be a user-specific one prepared for each user, or may be an average one obtained from a known database or the like. For example, in a case where the user cannot use the head-related transfer function specific to the user, the user may use an average head-related transfer function. These user-specific head-related transfer function and average head-related transfer function can be held in a terminal device carried by the user or the like, a server, a cloud, or the like.

As a method of using the acoustic transfer characteristic for each position as described above, various examples are conceivable.

Figure 2:
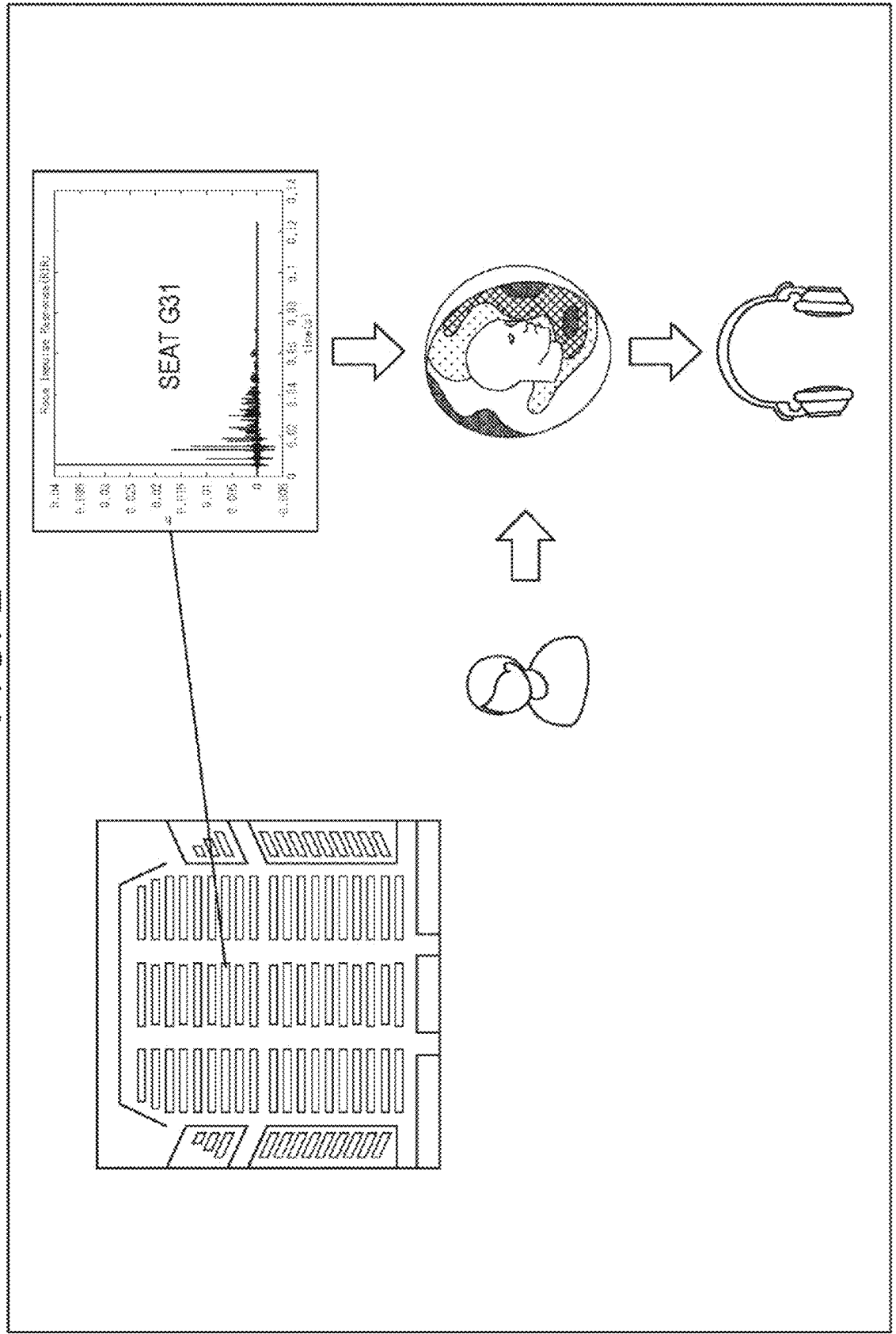
FIG. 2 is a diagram describing acoustic presentation with a movie theater as a target area.

Specifically, for example, as illustrated in FIG. 2, with a movie theater as a target area, an RIR is prepared for each seat in the movie theater, whereby more realistic acoustic presentation can be realized.

For example, assume that a user sits on a seat with a seat number "G31" in the movie theater and watches a movie in a state of wearing a pair of ear hole opening type headphones.

In this case, for example, the user logs in to a dedicated web page or the like, whereby the position information indicating the position of the user's own seat, here, the RIR associated with the seat number "G31" is specified.

Then, when the movie show is started, for example, the RIR and the head-related transfer function according to the user's seat number "G31" are convolved with respect to the audio data of the specific sound source of the movie, and the sound of a specific sound source is reproduced by the headphones on the basis of the audio data obtained as a result. Furthermore, at the same time, other voice of the movie is reproduced by a speaker installed in the movie theater, and the voice is also heard by the user.

In this case, the sound of the specific sound source can be localized to a desired position in the movie theater by convolution of the head-related transfer function. Furthermore, by convolution of the RIR, characteristics such as reverberation characteristics between a specific sound source position and the user position in an actual movie theater can also be added to the sound of the specific sound source.

Therefore, it is possible to realize highly realistic acoustic presentation as if the sound of the specific sound source came to the user from a predetermined position in the actual movie theater. Note that, as described above, a user-specific head-related transfer function may be used, or an average head-related transfer function may be used.

Similarly, it is possible to prepare an RIR for each of a plurality of positions with the entire theme park as a target area, for example, and present a voice of a specific character to the user when the user is at a predetermined position.

In this case, for example, the user wears a pair of ear hole opening type headphones, and the voice of the specific character is reproduced by the headphones.

Specifically, the RIR prepared for the position where the user is, for example, is convolved into the audio data of the voice of the specific character, and the voice of the specific character is reproduced on the basis of the audio data obtained as a result.

Doing this makes it possible to realize highly realistic acoustic presentation as if the specific character actually existed around the user. Note that also in this case, convolution of the head-related transfer function may also be performed.

Figure 3:
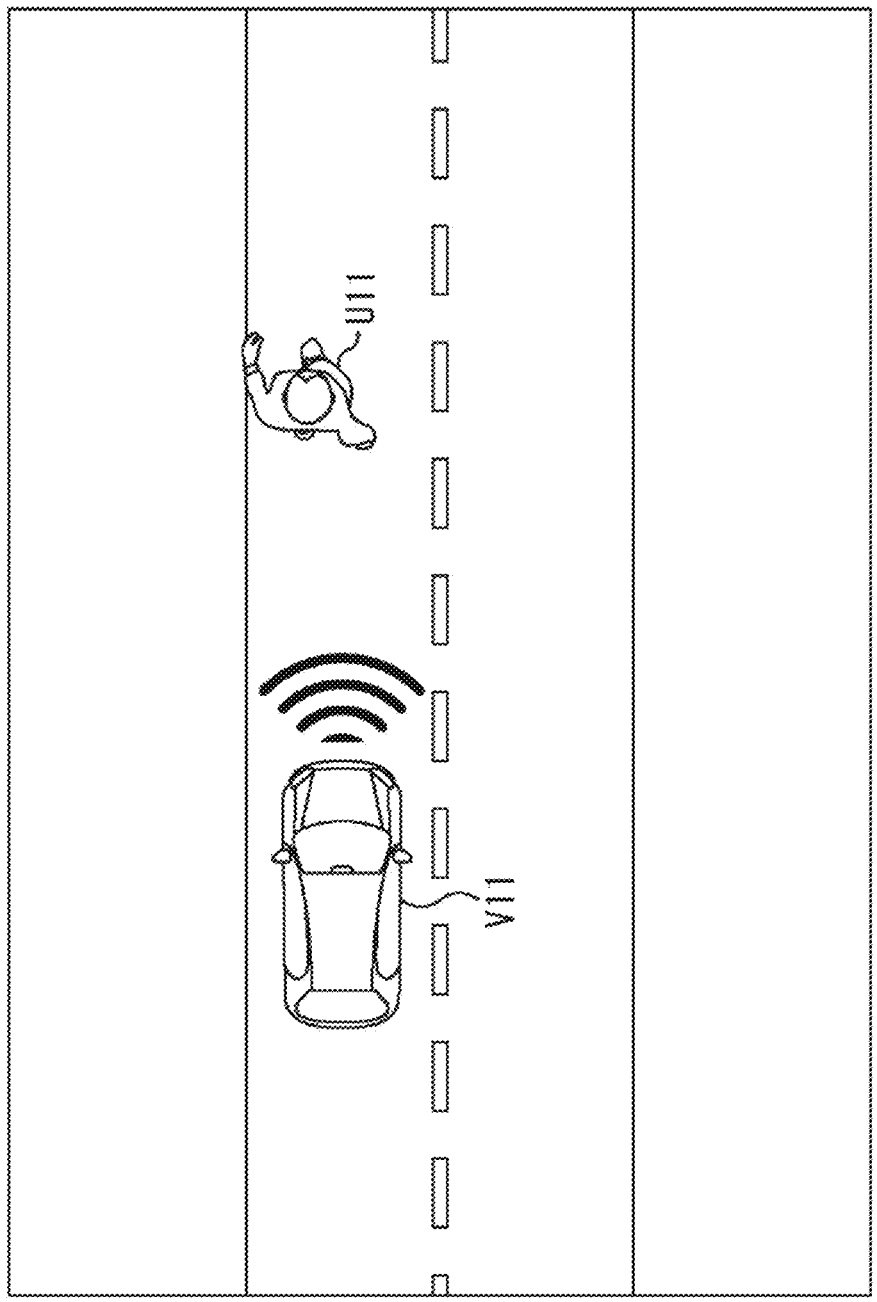
FIG. 3 is a diagram describing acoustic presentation with a space region including a road as a target area.

In addition, use of the present technology makes it possible to improve safety by presenting a virtual engine sound or a horn sound of a vehicle V11 to a user U11, who is a pedestrian, in a case where the user U11 is in front of the vehicle V11 traveling on the road as illustrated in FIG. 3, for example.

In the connected car era, information indicating the positions of the vehicle V11 and the user U11 can be highly accurately obtained by the satellite positioning system.

Furthermore, when the actual engine sound or traveling sound of the vehicle V11 is small, such as a case where the vehicle V11 is an electric car, the user U11 is less likely to notice the presence of the vehicle V11 behind the user.

Then, for example, when an RIR is prepared for each of a plurality of positions of the target area with a space region including a road as the target area, a virtual engine sound or a horn sound of the vehicle V11 can be presented to the user U11.

In such a case, for example, the user U11 carries a mobile terminal capable of acquiring information indicating the user's position, and wears a pair of ear hole opening type headphones connected to the mobile terminal in a wired or wireless manner.

Furthermore, for example, a predetermined server holds audio data for reproducing a virtual engine sound or a virtual horn sound.

For example, the server communicates with the vehicle V11 to acquire information indicating the position of the vehicle V11, and also communicates with the mobile terminal of the user U11 to acquire information indicating the position of the mobile terminal.

Then, for example, in a case where the vehicle V11 approaches the user U11, that is, in a case where the distance from the vehicle V11 to the user U11 becomes equal to or less than a predetermined threshold, the RIR prepared for the position of the vehicle V11 or the user U11 is acquired from the cloud or the like.

Moreover, the server convolves the held audio data of the virtual engine sound and the virtual horn sound with the acquired RIR, and supplies the resultant audio data to the mobile terminal of the user U11. At this time, convolution of the head-related transfer function is also appropriately performed.

By supplying, to the headphones, the audio data supplied from the server, and controlling to reproduce the sound based on the audio data, the mobile terminal of the user U11 can present the user U11 with the virtual engine sound and the virtual horn sound of the vehicle V11.

In this case, by performing convolution of the RIR and the head-related transfer function, it is not only possible to localize the virtual engine sound and the virtual horn sound in a direction where the vehicle V11 actually exists as viewed from the user U11 but also possible to present the sound as if the sound was actually emitted from the vehicle V11.

Therefore, the user U11 can easily grasp as to which direction as viewed from the user U the vehicle V11 exists behind the user U and how far the position of the vehicle V11 from the user U is. In particular, use of the RIR according to the positions of the user U11 and the vehicle V11 enables a sense of distance from the vehicle V11 to the user U11 to be added to the virtual engine sound and the virtual horn sound.

Note that the mobile terminal of the user U11 may acquire RIR and audio data from the server and perform convolution of the RIR and the head-related transfer function.

Furthermore, for example, in a case where the RIR is a function having a distance as an argument, it is possible to obtain the RIR according to the distance between the user U11 and the vehicle V11, and it is possible to realize acoustic presentation with higher reality.

In addition, for example, the server may supply the vehicle V11 with information indicating the position of the user U11. By doing so, the vehicle V11 can grasp the presence of the user U11 and avoid occurrence of an accident even when, for example, the vehicle V11 is in automatic driving or the field of view is dark at night or the like.

Moreover, as another use example of the acoustic transfer characteristic for each position, it is also conceivable to, with an urban area as a target area, arrange an acoustic event, that is, a virtual sound source, at a desired position in the urban area.

Figure 4:
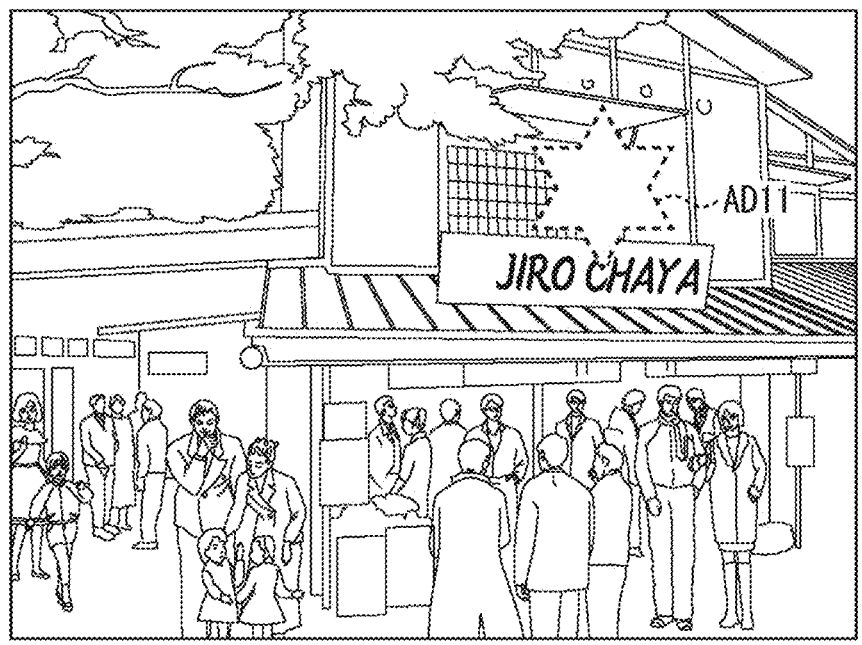
FIG. 4 is a diagram describing arrangement of acoustic events in a target area.

For example, as illustrated in FIG. 4, an arbitrary acoustic event AD11 such as an advertisement voice may be arranged at a predetermined position in the urban area that is the target area.

In this example, for example, in a server that manages acoustic events, one or a plurality of acoustic events including the acoustic event AD11 and information indicating arrangement positions of those acoustic events are managed in association with each other.

Then, for example, when the user comes to the arrangement position of the acoustic event AD11, an advertisement voice such as "thrice the points today" is presented to the user as the acoustic event AD11.

At this time, the audio data of the acoustic event AD11 and the RIR prepared for the arrangement position of the acoustic event AD11 are convolved.

By doing so, it is possible to perform highly realistic acoustic presentation to the user as if the sound of the acoustic event AD11 was actually generated at the position around the user.

The presentation of the acoustic event AD11 to the user can be performed by, for example, the pair of ear hole opening type headphones worn by the user.

In such a case, for example, the headphones themselves or the terminal device connected to the headphone in a wired or wireless manner is only required to acquire the audio data after the RIR convolution from the server, or is only required to acquire the RIR or audio data from the server or the cloud and perform convolution.

Furthermore, as described with reference to FIG. 4, in a case where an acoustic event is arranged in an urban area as a target area, the arrangement position of the acoustic event may be visualized and presented to the user.

Figure 5:
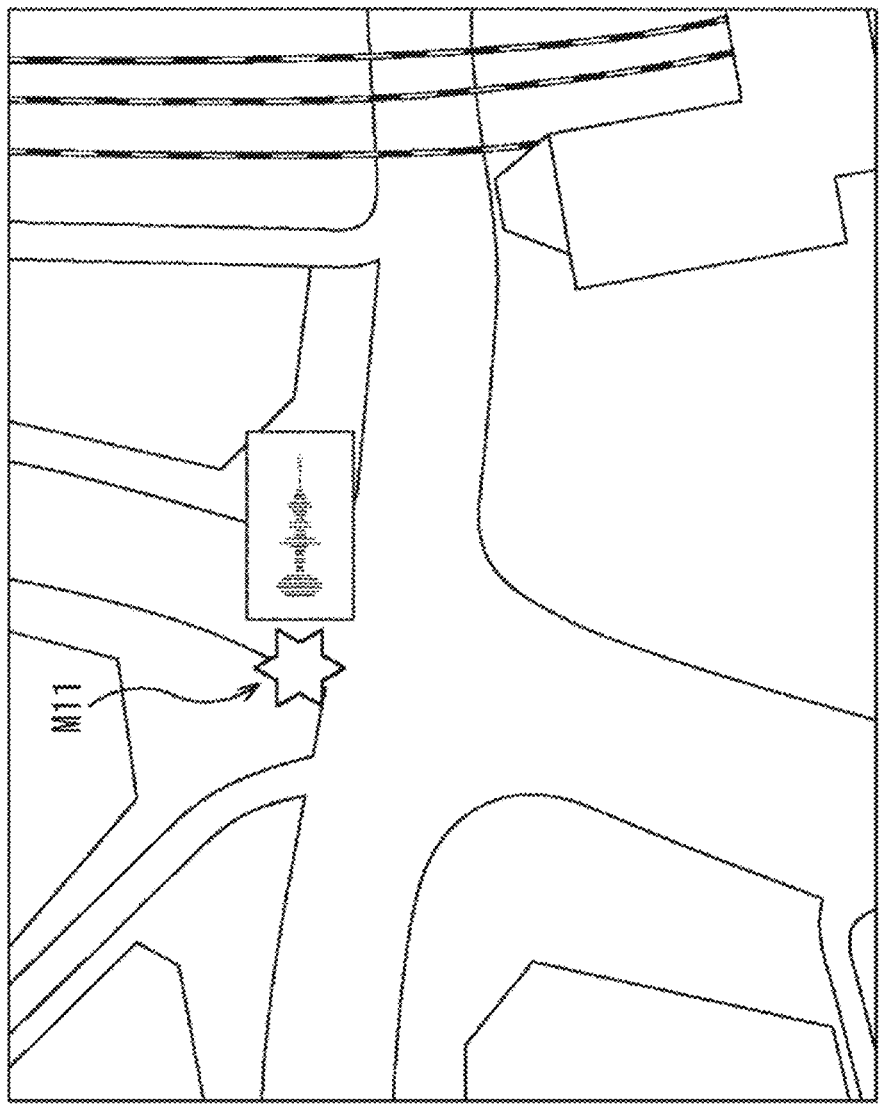
FIG. 5 is a diagram illustrating a display example of an event image representing an acoustic event.

Specifically, for example, as illustrated in FIG. 5, the user may be enabled to instantaneously grasp the position of the acoustic event by controlling to display an event image M11 representing an acoustic event on a map of the target area.

In the example of FIG. 5, the event image M11 representing the acoustic event is displayed at a position where the acoustic event is arranged on the map.

Here, a speech waveform that evokes an acoustic event is drawn in a right part of the figure of the event image M11, and a graphic having a shape corresponding to the type of acoustic event is drawn in a left part of the figure of the event image M11.

Thus, by controlling to display, on the mobile terminal of the user or the like, a display image such as a map on which the event image M11 is arranged such that the type of the acoustic event or the like can be grasped, the user can instantaneously grasp as to what acoustic event is present at which position in the target area.

Note that, in the event image M11, for example, a text message regarding the acoustic event such as a text message introducing the acoustic event, a text indicating the type of the acoustic event, a period in which the acoustic event is arranged at the position, and the like may also be displayed.

Furthermore, information indicating the arrangement position and the like of the acoustic event (virtual sound source) present around the current position of the user is not limited to the map information illustrated in FIG. 5, and may be any information such as text information indicating the arrangement position or voice information for reading out the arrangement position.

Therefore, the event image M11 may be superimposed and displayed as an augmented reality (AR) image on an environment image whose subject is the surrounding of the mobile terminal, the environment image imaged by the mobile terminal carried by the user, for example.

Furthermore, in a case where a plurality of acoustic events is arranged in an urban area as a target area, the acoustic event desired to be presented differs from user to user.

Therefore, for example, the user may be able to access a web page or the like of a server that manages presentation of the acoustic event in advance, and designate (set) the type or the like of the acoustic event that the user desires to be presented.

In such a case, even when the user is present at the arrangement position of an acoustic event, if the acoustic event is not one that the user desires to be presented, the acoustic event is not presented to the user.

Moreover, the RIR at each position in the target area may be held in any form, and for example, by compressing the dimension of the data of the RIR, it is possible to reduce the recording region for holding the RIR.

Figure 6:
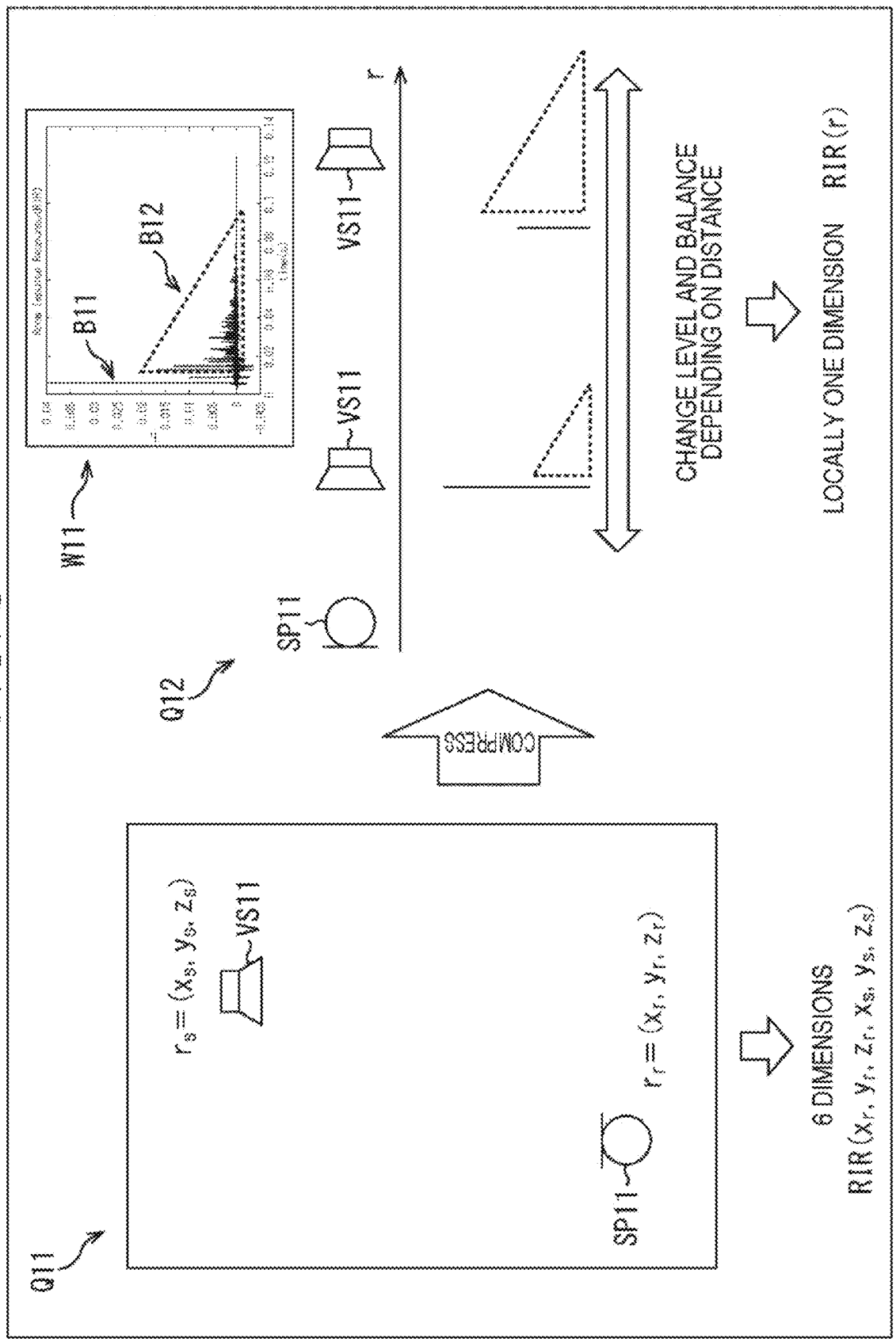
FIG. 6 is a diagram describing an RIR holding mode.

For example, in order to hold a strict RIR for every position in the target area, as indicated by Q11 in FIG. 6, it is necessary to prepare the RIR for every combination of the arrangement position of a virtual sound source VS11 such as an acoustic event and a listening position (user position) of the sound of the virtual sound source VS11, that is, the arrangement position of a microphone SP11 that measures the RIR.

In this example, assume that the RIR from the virtual sound source VS11 to the microphone SP11 is measured by collecting, by the microphone SP11, the sound output from the speaker corresponding to the virtual sound source VS11.

Here, the position in the target area where the virtual sound source VS11 and the microphone SP11 are arranged is represented by three-dimensional orthogonal coordinates.

In particular, assume that the arrangement position of the virtual sound source VS11 is a position $r_s=(x_s, y_s, z_s)$, and the arrangement position of the microphone SP11 is a position $r_r=(x_r, y_r, z_r)$.

In such a case, strictly speaking, the RIR has to be measured and held for every combination of the position $r_s$ and the position $r_r$. The combination of the position $r_s$ and the position $r_r$ is represented by a six-dimensional parameter (coordinates), and therefore the recording region for holding the RIR also becomes large.

On the other hand, for example, as indicated by Q12, if the RIR is held as a function with a distance r from the microphone SP11 to the virtual sound source VS11 as an argument, the order can be compressed to one dimension.

The RIR is an impulse response in which a vertical axis is a level and a horizontal axis is time as illustrated in a part of W11, for example. Such RIR includes a part indicated by B11, that is, a component of direct sound, and a portion indicated by B12, that is, components of early reflection and rear reverberation.

The balance (magnitude ratio) of the levels of the component of direct sound and the components of early reflection and rear reverberation, and the level itself of each component change depending on the distance r. Therefore, if the RIR is expressed by a function with the distance r as an argument, it is possible to reduce the recording region for holding the RIR at each position in the target area.

<Configuration Example of Acoustic Reproduction System>

Next, an acoustic reproduction system to which the present technology is applied will be described.

Figure 7:
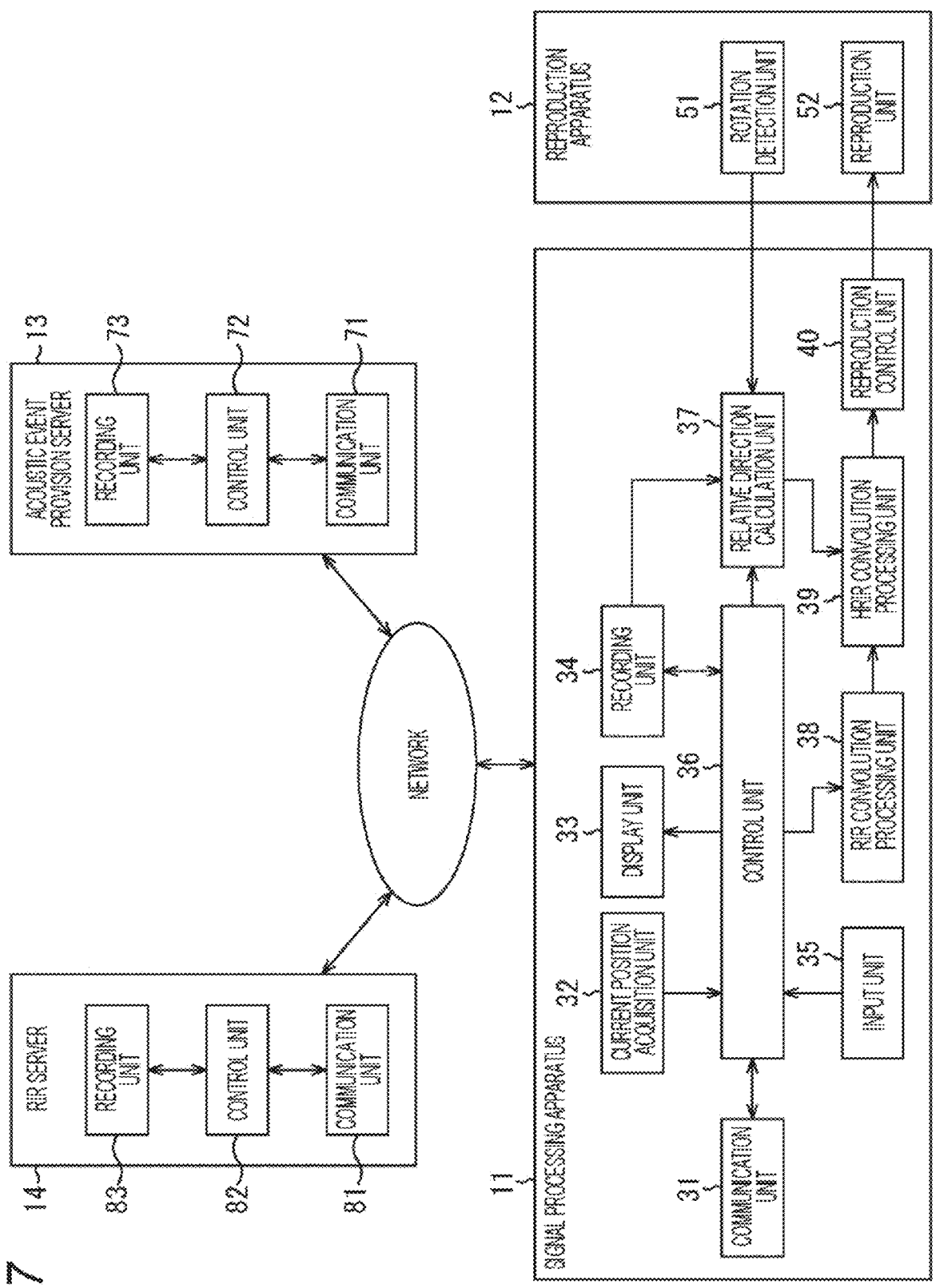
FIG. 7 is a diagram illustrating a configuration example of an acoustic reproduction system.

For example, as illustrated in FIG. 7, the acoustic reproduction system includes a signal processing apparatus 11, a reproduction apparatus 12, an acoustic event provision server 13, and an RIR server 14.

In the acoustic reproduction system, the signal processing apparatus 11, the acoustic event provision server 13, and the RIR server 14 are interconnected via a network such as the Internet.

The signal processing apparatus 11 includes, for example, a mobile terminal device such as a smartphone or a tablet carried by the user.

Furthermore, the reproduction apparatus 12 is an acoustic reproduction apparatus including, for example, a pair of ear hole opening type headphones, earphones, or the like, and is worn on the user's head, more specifically, the user's ears. The reproduction apparatus 12 is connected to the signal processing apparatus 11 in a wired or wireless manner.

The signal processing apparatus 11 functions as a reproduction control apparatus that receives, from the acoustic event provision server 13, supply of virtual sound source data of an acoustic event, that is, the virtual sound source arranged in the target area, and controls reproduction of the sound of the virtual sound source in the reproduction apparatus 12.

Here, the virtual sound source data is audio data for reproducing the sound of the acoustic event, that is, the virtual sound source.

The signal processing apparatus 11 includes a communication unit 31, a current position acquisition unit 32, a display unit 33, a recording unit 34, an input unit 35, a control unit 36, a relative direction calculation unit 37, an RIR convolution processing unit 38, an HRIR convolution processing unit 39, and a reproduction control unit 40.

The communication unit 31 communicates with the acoustic event provision server 13 and the RIR server 14 via the network, receives data transmitted from a communications partner and supplies the data to the control unit 36, and transmits, to the communications partner, data supplied from the control unit 36.

Here, the communication unit 31 functions as an acquisition unit that acquires the RIR and virtual sound source data according to the current position of the signal processing apparatus 11 serving as a presentation destination of the virtual sound source (acoustic event).

The current position acquisition unit 32 includes, for example, a GPS module and the like, measures the current position of the signal processing apparatus 11, that is, the current position of the user, and supplies current position information indicating the measurement result to the control unit 36.

The display unit 33 includes an arbitrary display device such as an organic electro luminescence (EL) display, and displays various images under the control of the control unit 36.

The recording unit 34 includes a nonvolatile memory, and records data supplied from the control unit 36 and supplies the recorded data to the control unit 36 and the relative direction calculation unit 37.

For example, for every direction of the virtual sound source viewed from the user, the recording unit 34 records data for adding a transfer characteristic from the virtual sound source to the user's ear (eardrum), that is, a head-related transfer function for localizing a sound image at the position of the virtual sound source. This head-related transfer function may be a user-specific one or an average one.

Note that the head-related transfer function may be recorded in the form of a head related impulse response (HRIR), which is information in the time domain, or may be recorded in the form of a head related transfer function (HRTF), which is information in the frequency domain, but the description will be continued below assuming that the HRIR is recorded in the recording unit 34.

The input unit 35 includes a touchscreen, a button, a switch, and the like superimposed on the display unit 33, for example, and supplies a signal corresponding to a user's operation to the control unit 36. The control unit 36 controls the entire operation of the signal processing apparatus 11.

The relative direction calculation unit 37 reads, from the recording unit 34, an HRIR corresponding to the head rotation information supplied from the reproduction apparatus 12 and the current position information and the virtual sound source position information supplied from the control unit 36, and supplies the HRIR to the HRIR convolution processing unit 39.

Here, the head rotation information is angle information indicating the direction of the reproduction apparatus 12, that is, the orientation of the head (rotation direction of the head) of the user wearing the reproduction apparatus 12, and includes, for example, a roll angle, a pitch angle, and a yaw angle indicating the orientation of the head of the user.

Furthermore, the virtual sound source position information is information indicating the arrangement position of the virtual sound source based on the virtual sound source data supplied from the acoustic event provision server 13.

The RIR convolution processing unit 38 performs convolution of the RIR and the virtual sound source data supplied from the control unit 36, and supplies the convoluted virtual sound source data, that is, the audio data obtained by the convolution to the HRIR convolution processing unit 39.

By convoluting the virtual sound source data supplied from the RIR convolution processing unit 38 and the HRIR supplied from the relative direction calculation unit 37, the HRIR convolution processing unit 39 generates and supplies, to the reproduction control unit 40, drive data for driving the reproduction apparatus 12 to reproduce the sound of the virtual sound source.

Note that the convolution of the RIR and the HRIR, that is, the acoustic transfer characteristic and the head-related transfer function with the virtual sound source data may be performed in the time domain or may be performed in the frequency domain. Furthermore, the RIR may be convolved after the HRIR is convolved with respect to the virtual sound source data.

On the basis of the drive data supplied from the HRIR convolution processing unit 39, the reproduction control unit 40 drives the reproduction apparatus 12 to reproduce the sound of the virtual sound source, that is, the acoustic event.

In the signal processing apparatus 11, for example, the control unit 36 to the reproduction control unit 40 are implemented by one or a plurality of processors.

Furthermore, the reproduction apparatus 12 includes a rotation detection unit 51 and a reproduction unit 52.

The rotation detection unit 51 includes, for example, a gyro sensor or the like, detects rotation of the reproduction apparatus 12, that is, the head of the user wearing the reproduction apparatus 12, and supplies head rotation information indicating the detection result to the relative direction calculation unit 37.

The reproduction unit 52 includes a speaker unit called a driver or the like, and reproduces the sound of the virtual sound source on the basis of the drive data supplied from the reproduction control unit 40.

Note that the reproduction apparatus 12 is provided with a reception unit in a case where the reproduction apparatus 12 which functions as an acoustic reproduction apparatus, and the signal processing apparatus 11, which is an external apparatus that supplies drive data (audio data) for reproducing the sound of the virtual sound source, to the acoustic reproduction apparatus (reproduction apparatus 12) are wirelessly connected. In such a case, the reception unit of the reproduction apparatus 12 receives and supplies, to the reproduction unit 52, the drive data transmitted from the signal processing apparatus 11. Furthermore, more specifically, even in a case where the reproduction apparatus 12 and the signal processing apparatus 11 are connected by wire, an input interface that is not illustrated or the like of the reproduction apparatus 12 that receives (acquires) the drive data output from the signal processing apparatus 11 functions as a reception unit.

The acoustic event provision server 13 includes a communication unit 71, a control unit 72, and a recording unit 73.

The communication unit 71 communicates with the signal processing apparatus 11 and the like via a network. That is, the communication unit 71 transmits data supplied from the control unit 72 to the communications partner, or receives data transmitted from the communications partner and supplies the data to the control unit 72.

The control unit 72 controls the entire operation of the acoustic event provision server 13. The recording unit 73 records various data and supplies the recorded data to the control unit 72 as appropriate.

For example, for each virtual sound source, the recording unit 73 records virtual sound source position information indicating the arrangement position of the virtual sound source, virtual sound source data, and virtual sound source metadata in association with one another.

Here, the virtual sound source metadata is metadata regarding the virtual sound source data such as, for example, the age and gender of the distribution target of the virtual sound source data, the category of the acoustic event (virtual sound source), and the reproduction language of the acoustic event.

For example, if the virtual sound source metadata includes information indicating the age and gender of the distribution target, the provision (distribution) of the acoustic event can be restricted by age and gender.

Furthermore, for example, if the virtual sound source metadata includes information indicating the category of the acoustic event, the user can designate the category and select the acoustic event to be provided to the user.

Moreover, for example, if the virtual sound source metadata includes information indicating the reproduction language of the acoustic event, in a case where the virtual sound source data is voice data of a tourist guide or the like, the virtual sound source data can be prepared for each reproduction language, and multilingual support can be achieved. That is, it is possible to present an acoustic event in different reproduction languages for different users at the same position.

In addition, for example, if virtual sound source metadata includes a user ID of the user permitted to distribute the virtual sound source data (acoustic event), the registerer (creator) of the virtual sound source data can select the user who is a distribution target.

Moreover, for example, the recording unit 73 records, for a user registered in advance, the user ID indicating the user and user-related information related to the user in association with each other.

For example, the user-related information includes the age and gender of the user, information indicating the category of the acoustic event that the user desires to be distributed, information indicating the reproduction language of the acoustic event that the user desires, and the like.

The RIR server 14 includes a communication unit 81, a control unit 82, and a recording unit 83.

The communication unit 81 communicates with the signal processing apparatus 11 and the like via a network. That is, the communication unit 81 transmits data supplied from the control unit 82 to the communications partner, or receives data transmitted from the communications partner and supplies the data to the control unit 82.

The control unit 82 controls the entire operation of the RIR server 14. The recording unit 83 records various data and supplies the recorded data to the control unit 82 as appropriate.

For example, the recording unit 83 records, for each target area, transfer characteristic position information indicating each of a plurality of positions in the target area in association with the RIR as the acoustic transfer characteristic. That is, in the RIR server 14, the acoustic transfer characteristic (RIR) is prepared for each position in the target area.

Note that the RIR may be recorded in any form, for example, recorded as a function with the distance r as an argument as described with reference to FIG. 6.

Furthermore, in the example illustrated in FIG. 7, an example in which the acoustic event provision server 13 and the RIR server 14 are configured by one apparatus has been described. However, the acoustic event provision server 13 and the RIR server 14 may be configured by a plurality of apparatuses present on the cloud.

Moreover, the acoustic event provision server 13 and the RIR server 14 may be implemented by one apparatus. In addition, some of the functions of the signal processing apparatus 11 may be provided in the reproduction apparatus 12.

<Descriptions of Display Processing and Position Information Provision Processing>

Next, the operation of the acoustic reproduction system illustrated in FIG. 7 will be described.

For example, in the acoustic reproduction system, in a case where a user wearing the reproduction apparatus 12 and carrying the signal processing apparatus 11 is in a target area, when the user comes to the arrangement position of an acoustic event (virtual sound source), the user, that is, the signal processing apparatus 11 is provided with the acoustic event.

When at an arbitrary place, the user can cause the signal processing apparatus 11 to display a display image indicating as to, in the target area, what acoustic event is arranged and where the acoustic event is.

For example, when the input unit 35 is operated by the user and display of the display image is instructed, the signal processing apparatus 11 starts display processing, and in response to the display processing, the acoustic event provision server 13 performs position information provision processing.

Hereinafter, the display processing by the signal processing apparatus 11 and the position information provision processing by the acoustic event provision server 13 will be described with reference to the flowchart of FIG. 8.

In step S11, the control unit 36 of the signal processing apparatus 11 acquires and supplies, to the communication unit 31, current position information from the current position acquisition unit 32.

In step S12, the communication unit 31 transmits, to the acoustic event provision server 13, the current position information supplied from the control unit 36, and requests transmission of virtual sound source position information.

Then, in step S21, the communication unit 71 of the acoustic event provision server 13 receives the current position information transmitted from the signal processing apparatus 11, and supplies the current position information to the control unit 72.

In step S22, on the basis of the current position information supplied from the communication unit 71 and the virtual sound source position information of each virtual sound source recorded in the recording unit 73, the control unit 72 reads, from the recording unit 73, the virtual sound source position information of all the virtual sound sources whose distances from the current position of the user are equal to or less than a predetermined value. Then, the control unit 72 supplies the read virtual sound source position information to the communication unit 71.

Note that, for example, only the virtual sound source position information of the virtual sound source satisfying the presentation condition for the user, such as the virtual sound source position information of the virtual sound source (acoustic event) belonging to the category designated by the user, for example, may be read.

Furthermore, here, an example in which the arrangement position of the acoustic event arranged in the vicinity of the current position of the user is displayed as a display image will be described, but the arrangement position of an acoustic event in the vicinity of an arbitrary position different from the current position of the user may be displayed as the display image.

In such a case, in step S12, not the current position information but the position information indicating the arbitrary position designated by the user or the like is only required to be transmitted.

In step S23, the communication unit 71 transmits, to the signal processing apparatus 11, the virtual sound source position information supplied from the control unit 72, and the position information provision processing ends.

Note that, in step S23, information indicating the type of the virtual sound source, the virtual sound source metadata of the virtual sound source, and the like may be transmitted together with the virtual sound source position information.

Furthermore, in the signal processing apparatus 11, in step S13, the communication unit 31 receives the virtual sound source position information transmitted from the acoustic event provision server 13, and supplies the virtual sound source position information to the control unit 36. Therefore, the virtual sound source position information of the virtual sound source (acoustic event) arranged in the vicinity of the user is acquired.

In step S14, on the basis of the virtual sound source position information supplied from the communication unit 31, the control unit 36 generates a display image on which a mark representing the acoustic event is superimposed on the position indicated by the virtual sound source position information on the map of the vicinity of the current position of the user (signal processing apparatus 11).

Therefore, for example, the image illustrated in FIG. 5, that is, the map information indicating the arrangement position of the acoustic event is generated as the display image.

In step S15, the control unit 36 supplies the generated display image to the display unit 33 to display, and the display processing ends.

As described above, the signal processing apparatus 11 transmits the current position information to the acoustic event provision server 13, acquires the virtual sound source position information, and controls to display the display image indicating the position of the acoustic event. Furthermore, the acoustic event provision server 13 transmits the virtual sound source position information in response to a request from the signal processing apparatus 11.

By doing this, the user can easily grasp as to what kind of acoustic event (virtual sound source) is arranged at which position around the user.

Therefore, for example, the user views the display image displayed in step S15, and when there is an acoustic event of interest, the user can move to the position where the acoustic event is presented.

<Descriptions of Reproduction Processing, RIR Provision Processing, and Acoustic Event Provision Processing>

Figure 9:
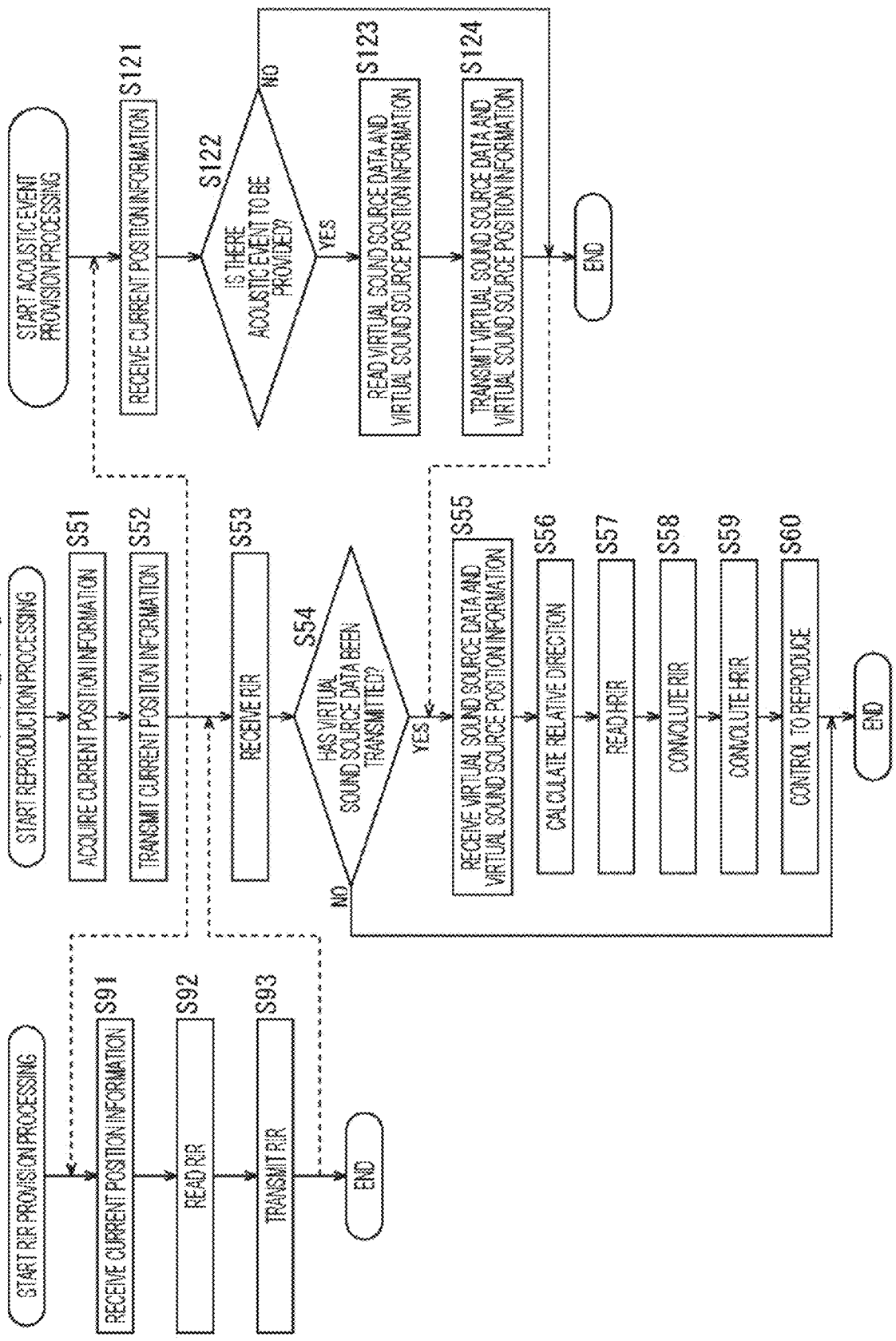
FIG. 9 is a flowchart describing reproduction processing, RIR provision processing, and acoustic event provision processing.

Furthermore, when the user activates an application or the like for receiving provision of an acoustic event in the signal processing apparatus 11, the processing illustrated in FIG. 9 is performed, and the acoustic event is provided as appropriate.

Hereinafter, the reproduction processing by the signal processing apparatus 11, the RIR provision processing by the RIR server 14, and the acoustic event provision processing by the acoustic event provision server 13 will be described with reference to the flowchart of FIG. 9.

When the application is activated, the signal processing apparatus 11 starts the reproduction processing and performs the processing of step S51.

That is, in step S51, the control unit 36 acquires the current position information from the current position acquisition unit 32. Furthermore, the control unit 36 acquires a user ID for identifying the user from the recording unit 34, and supplies the current position information and the user ID to the communication unit 31.

In step S52, the communication unit 31 transmits, to the RIR server 14, the current position information supplied from the control unit 36, and requests transmission of the RIR.

Furthermore, the communication unit 31 transmits, to the acoustic event provision server 13, the current position information and the user ID supplied from the control unit 36, and requests transmission of the virtual sound source data.

When the current position information is transmitted in this manner, the RIR provision processing is started in the RIR server 14.

That is, in step S91, the communication unit 81 receives the current position information transmitted from the signal processing apparatus 11, and supplies the current position information to the control unit 82.

In step S92, on the basis of the current position information supplied from the communication unit 81, the control unit 82 reads the RIR from the recording unit 83, and supplies the RIR to the communication unit 81.

For example, the control unit 82 reads, from the recording unit 83, the RIR in which the distance between the current position of the user and the position indicated by the transfer characteristic position information is minimum from among the RIRs of the target area including the current position of the user indicated by the current position information.

This is because, among the RIRs at each position in the target area, the RIR whose position indicated by the transfer characteristics position information is closest to the current position of the user is for adding sound characteristics such as actual reverberation and the like at the current position of the user.

Note that, in a case where there is no RIR in which the distance between the position indicated by the transfer characteristic position information and the current position of the user is equal to or less than a predetermined threshold, it is determined that no RIR is present at the current position of the user, and transmission of the RIR to the signal processing apparatus 11 may be omitted. Furthermore, for example, as described with reference to FIG. 6, in a case where the RIR is recorded as a function with the distance r as an argument, the distance r obtained from the transfer characteristic position information and the current position information is substituted into the function, and the RIR is obtained.

In step S93, the communication unit 81 transmits, to the signal processing apparatus 11, the RIR supplied from the control unit 82, and the RIR provision processing ends.

Furthermore, when the current position information and the user ID are transmitted to the acoustic event provision server 13 in step S52, the acoustic event provision server 13 starts the acoustic event provision processing.

That is, in step S121, the communication unit 71 receives and supplies, to the control unit 72, the current position information and the user ID transmitted from the signal processing apparatus 11.

In step S122, on the basis of the current position information and the user ID supplied from the communication unit 71, the control unit 72 determines whether or not there is an acoustic event (virtual sound source), that is, virtual sound source data to be provided to the user indicated by the user ID.

For example, the control unit 72 performs determination processing as to whether there is an acoustic event to be provided to the user, on the basis of the current position information, and the user-related information associated with the user ID recorded in the recording unit 73, the virtual sound source position information, and the virtual sound source metadata.

Specifically, for example, on the basis of the current position information and the virtual sound source position information, the control unit 72 searches for, as an acoustic event of the provision candidate, a virtual sound source (acoustic event) arranged at a position where the distance to the current position of the user indicated by the current position information is equal to or less than a predetermined threshold.

Furthermore, on the basis of the user-related information associated with the user ID and the virtual sound source metadata of the acoustic event of a provision candidate, the control unit 72 selects an acoustic event to be provided to the user from among the acoustic events of provision candidates.

Specifically, as the acoustic event to be provided to the user, for example, the acoustic event of the provision candidate in which the age and gender of the user indicated by the user-related information are the age and gender of the distribution target indicated by the virtual sound source metadata is selected.

Furthermore, as the acoustic event to be provided to the user, for example, the acoustic event of the provision candidate in which the category indicated by the virtual sound source metadata is the same as the category desired to be distributed indicated by the user-related information is selected.

Moreover, as the acoustic event to be provided to the user, for example, the acoustic event of the provision candidate in which the reproduction language indicated by the virtual sound source metadata is the same as the desired reproduction language indicated by the user-related information is selected.

Note that, in a case where the user-related information is not recorded in the recording unit 73 or in a case where the acoustic event is provided to all users in the vicinity of the arrangement position of the acoustic event, all the acoustic events of the provision candidates described above are selected as the acoustic events to be provided to the user.

In this way, performing the determination processing as to whether there is an acoustic event to be provided and providing the acoustic event according to the determination result can be said to be determining whether or not the user satisfies the presentation condition of the acoustic event and providing the acoustic event in a case where the user satisfies the presentation condition.

In a case where it is determined in step S122 that there is no acoustic event to be provided to the user, the acoustic event is not provided, and the acoustic event provision processing ends. In this case, a notification indicating that there is no acoustic event to be provided may be transmitted from the acoustic event provision server 13 to the signal processing apparatus 11.

On the other hand, in a case where it is determined in step S122 that there is an acoustic event to be provided to the user, thereafter, the processing proceeds to step S123.

In step S123, the control unit 72 reads, from the recording unit 73, and supplies, to the communication unit 71, the virtual sound source data and the virtual sound source position information of the acoustic event (virtual sound source) to be provided to the user that have been specified in the processing in step S122.

In step S124, the communication unit 71 transmits, to the signal processing apparatus 11, the virtual sound source data and the virtual sound source position information supplied from the control unit 72, and the acoustic event provision processing ends.

Furthermore, after performing the processing of step S52, the signal processing apparatus 11 performs the processing of step S53.

In step S53, the communication unit 31 receives and supplies, to the control unit 36 the RIR transmitted from the RIR server 14 by the processing in step S93. Furthermore, the control unit 36 supplies, to the RIR convolution processing unit 38, the RIR supplied from the communication unit 31.

Therefore, the communication unit 31 supplies (transmits) the information indicating the current position of the signal processing apparatus 11 to the RIR server 14 as the current position information indicating the current position of the presentation destination of the acoustic event (virtual sound source), thereby acquiring the RIR according to the current position of the signal processing apparatus 11.

Note that the signal processing apparatus 11 may acquire (download) and record in advance the RIR of each position of the target area from the RIR server 14.

Furthermore, the signal processing apparatus 11 may acquire the RIR from the RIR server 14 via the acoustic event provision server 13.

In such a case, the communication unit 71 of the acoustic event provision server 13 transmits the current position information received in step S121 to the RIR server 14. Then, the RIR server 14 performs processing similar to that in steps S91 to S93, and the read RIR is transmitted to the acoustic event provision server 13 by the communication unit 81 and received by the communication unit 71.

Then, the acoustic event provision server 13 transmits the RIR received from the RIR server 14 to the signal processing apparatus 11 by the communication unit 71, and in step S53, the communication unit 31 receives the RIR transmitted from the acoustic event provision server 13.

In step S54, the control unit 36 determines whether or not the virtual sound source data of the acoustic event has been transmitted from the acoustic event provision server 13.

In a case where it is determined in step S54 that the virtual sound source data has not been transmitted, there is no acoustic event to be presented to the user, and therefore the reproduction processing ends.

On the other hand, in a case where it is determined in step S54 that the virtual sound source data has been transmitted, in step S55, the communication unit 31 receives and supplies, to the control unit 36, the virtual sound source data and the virtual sound source position information transmitted from the acoustic event provision server 13.

The control unit 36 supplies, to the RIR convolution processing unit 38, the virtual sound source data supplied from the communication unit 31, and supplies, to the relative direction calculation unit 37, the virtual sound source position information supplied from the communication unit 31 and the current position information acquired in step S51.

By the processing in step S55, the communication unit 31 supplies, to the acoustic event provision server 13, the current position information indicating the current position of the signal processing apparatus 11 to be the presentation destination of the acoustic event (virtual sound source), thereby acquiring the virtual sound source data and the virtual sound source position information according to the current position.

Note that, here, an example in which the virtual sound source data is directly received from the acoustic event provision server 13 will be described, but the virtual sound source data may be received from the RIR server 14.

In such a case, the communication unit 81 of the RIR server 14 receives the current position information and the user ID from the signal processing apparatus 11, and further transmits the current position information and the user ID to the acoustic event provision server 13.

Then, the acoustic event provision server 13 performs processing similar to that in steps S121 to S124 described above, and the virtual sound source data and the virtual sound source position information are transmitted from the acoustic event provision server 13 to the RIR server 14 and received by the communication unit 81 of the RIR server 14.

Then, the RIR server 14 transmits the virtual sound source data and the virtual sound source position information received from the acoustic event provision server 13 to the signal processing apparatus 11 by the communication unit 81, and in step S55, the communication unit 31 receives the virtual sound source data and the virtual sound source position information transmitted from the RIR server 14.

In step S56, the relative direction calculation unit 37 calculates a relative direction of the arrangement position of the virtual sound source (acoustic event) viewed from the user, on the basis of the virtual sound source position information and the current position information supplied from the control unit 36 and the head rotation information supplied from the rotation detection unit 51 of the reproduction apparatus 12.

In step S57, the relative direction calculation unit 37 reads, from the recording unit 34, and supplies, to the HRIR convolution processing unit 39, the HRIR corresponding to the relative direction calculated in step S56.

Therefore, the relative direction calculation unit 37 selects an appropriate HRIR on the basis of the virtual sound source position information, the current position information, and the head rotation information, and reads, from the recording unit 34, and supplies, to the HRIR convolution processing unit 39, the selected HRIR.

In step S58, the RIR convolution processing unit 38 convolves the RIR and the virtual sound source data supplied from the control unit 36, and supplies the virtual sound source data obtained as a result to the HRIR convolution processing unit 39. Therefore, characteristics such as reverberation and the like in the place where the user is actually present are added to the virtual sound source data.

In step S59, the HRIR convolution processing unit 39 convolves the virtual sound source data supplied from the RIR convolution processing unit 38 and the HRIR supplied from the relative direction calculation unit 37, and supplies the drive data obtained as a result to the reproduction control unit 40.

Therefore, the drive data for localizing the sound image of the virtual sound source (acoustic event) in the relative direction of the acoustic event viewed from the user, that is, the drive data of the binaural voice is obtained.

In step S60, the reproduction control unit 40 supplies, to the reproduction unit 52 of the reproduction apparatus 12, the drive data supplied from the HRIR convolution processing unit 39 to drive the reproduction unit 52, thereby reproducing the acoustic event based on the drive data.

When the acoustic event is reproduced in this manner, the reproduction processing ends.

As described above, the signal processing apparatus 11 acquires the virtual sound source data and the RIR according to the current position information of the user, convolves the RIR and the HRIR with respect to the virtual sound source data, and controls to reproduce the acoustic event (virtual sound source) on the basis of the obtained drive data.

In this way, by acquiring the RIR according to the current position of the user to generate the drive data, it is possible to realize more realistic acoustic presentation.

Second Embodiment

<Configuration Example of Acoustic Reproduction System>

Note that, while an example in which the signal processing apparatus 11 acquires the RIR and generates the drive data has been described above, the RIR server 14 or the acoustic event provision server 13 may generate the drive data.

Figure 10:
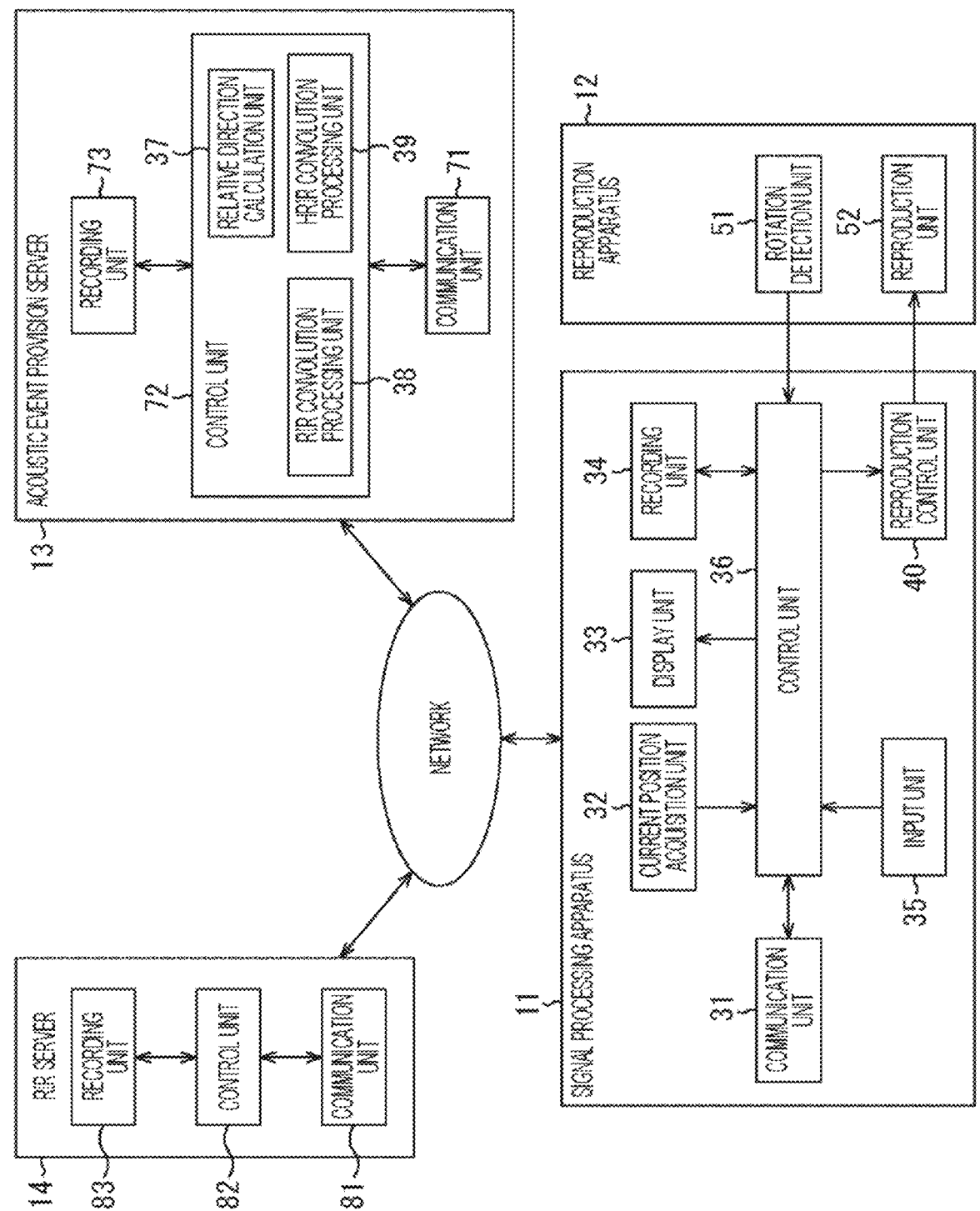
FIG. 10 is a diagram illustrating a configuration example of an acoustic reproduction system.

For example, in a case where the acoustic event provision server 13 generates the drive data, the acoustic reproduction system is configured as illustrated in FIG. 10. Note that, in FIG. 10, parts corresponding to those in the case of FIG. 7 are denoted by the same reference signs, and the description thereof will be omitted as appropriate.

The acoustic reproduction system illustrated in FIG. 10 includes a signal processing apparatus 11, a reproduction apparatus 12, an acoustic event provision server 13, and an RIR server 14, and the signal processing apparatus 11, the acoustic event provision server 13, and the RIR server 14 are interconnected via a network.

In this example, the signal processing apparatus 11 includes a communication unit 31, a current position acquisition unit 32, a display unit 33, a recording unit 34, an input unit 35, a control unit 36, and a reproduction control unit 40.

That is, the configuration of the signal processing apparatus 11 illustrated in FIG. 10 is different from that of the signal processing apparatus 11 in FIG. 7 in that the relative direction calculation unit 37 to the HRIR convolution processing unit 39 are not provided, and is the same as that of the signal processing apparatus 11 in FIG. 7 in other regards.

Furthermore, in the example illustrated in FIG. 10, the configurations of the reproduction apparatus 12 and the RIR server 14 are the same as those in the case of FIG. 7.

Note that, also in the example illustrated in FIG. 10, similarly to the case of the first embodiment described above, the reproduction apparatus 12, which is an acoustic reproduction apparatus, may be provided with a reception unit that receives and supplies, to the reproduction unit 52, drive data transmitted by the signal processing apparatus 11, which is an external apparatus.

Furthermore, for example, the signal processing apparatus 11 and the reproduction apparatus 12 may be integrated into one acoustic reproduction apparatus, and in such a case, the communication unit 31 functions as a reception unit that receives drive data transmitted by the acoustic event provision server 13 as an external apparatus.

Moreover, in the example illustrated in FIG. 10, the acoustic event provision server 13 includes a communication unit 71, a control unit 72, and a recording unit 73, and the relative direction calculation unit 37, the RIR convolution processing unit 38, and the HRIR convolution processing unit 39 are implemented by the control unit 72.

That is, the control unit 72 has the relative direction calculation unit 37, the RIR convolution processing unit 38, and the HRIR convolution processing unit 39.

The recording unit 73 records virtual sound source position information, virtual sound source data, and virtual sound source metadata in association with one another, and records the user ID and the user-related information in association with each other. Furthermore, the recording unit 73 records an HRIR for every direction of the virtual sound source viewed from the user.

Moreover, in this example, the communication unit 71 of the acoustic event provision server 13 functions as an acquisition unit that acquires current position information from the signal processing apparatus 11 and acquires an RIR corresponding to the current position of the signal processing apparatus 11 from the RIR server 14.

<Descriptions of Reproduction Processing, RIR Provision Processing, and Acoustic Event Provision Processing>

Next, the operation of the acoustic reproduction system illustrated in FIG. 10 will be described.

Figure 8:
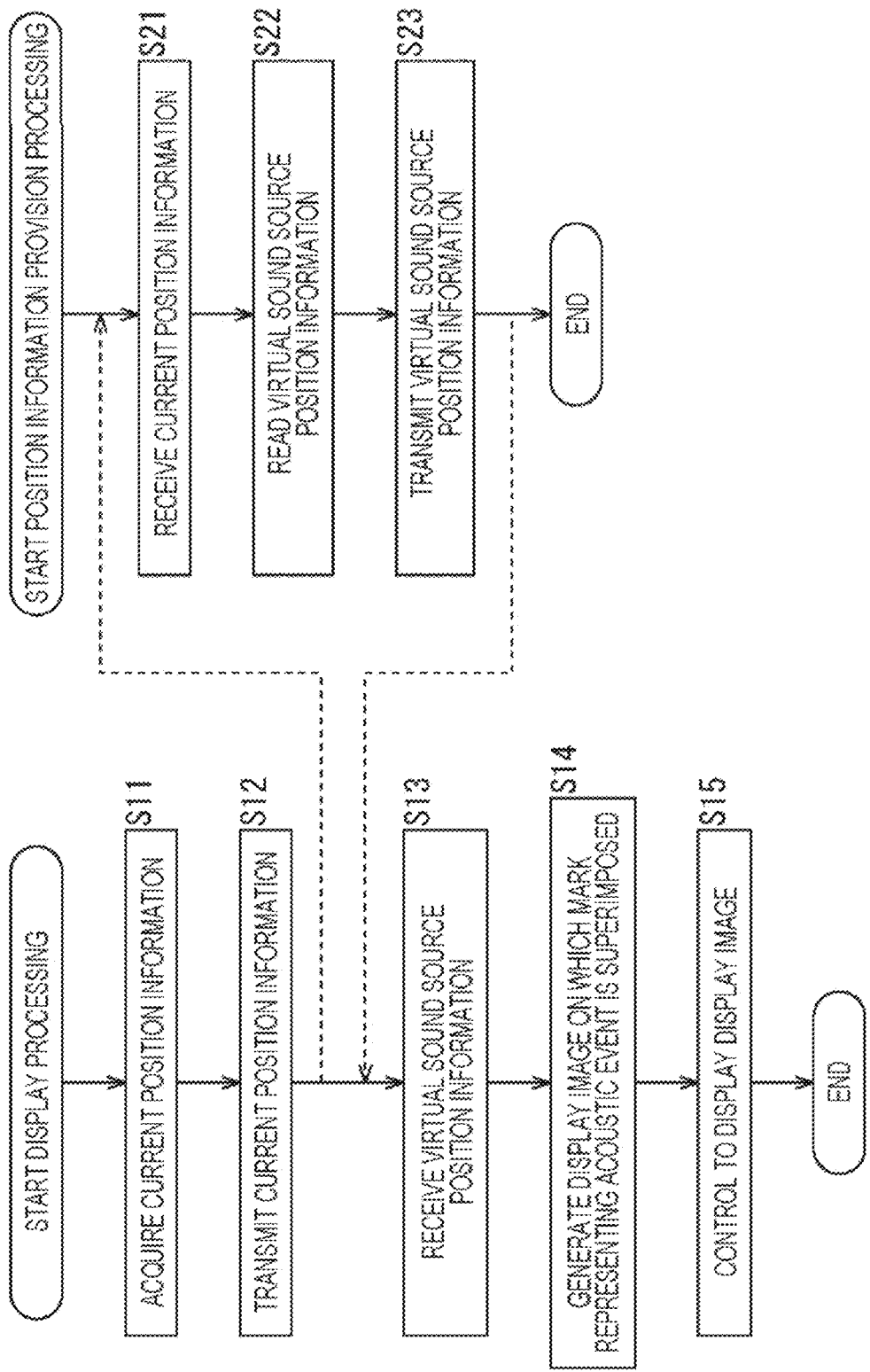
FIG. 8 is a flowchart describing display processing and position information provision processing.

For example, in the acoustic reproduction system illustrated in FIG. 10, the display processing and the position information provision processing described with reference to FIG. 8 are performed between the signal processing apparatus 11 and the acoustic event provision server 13, and the display image is displayed.

Figure 11:
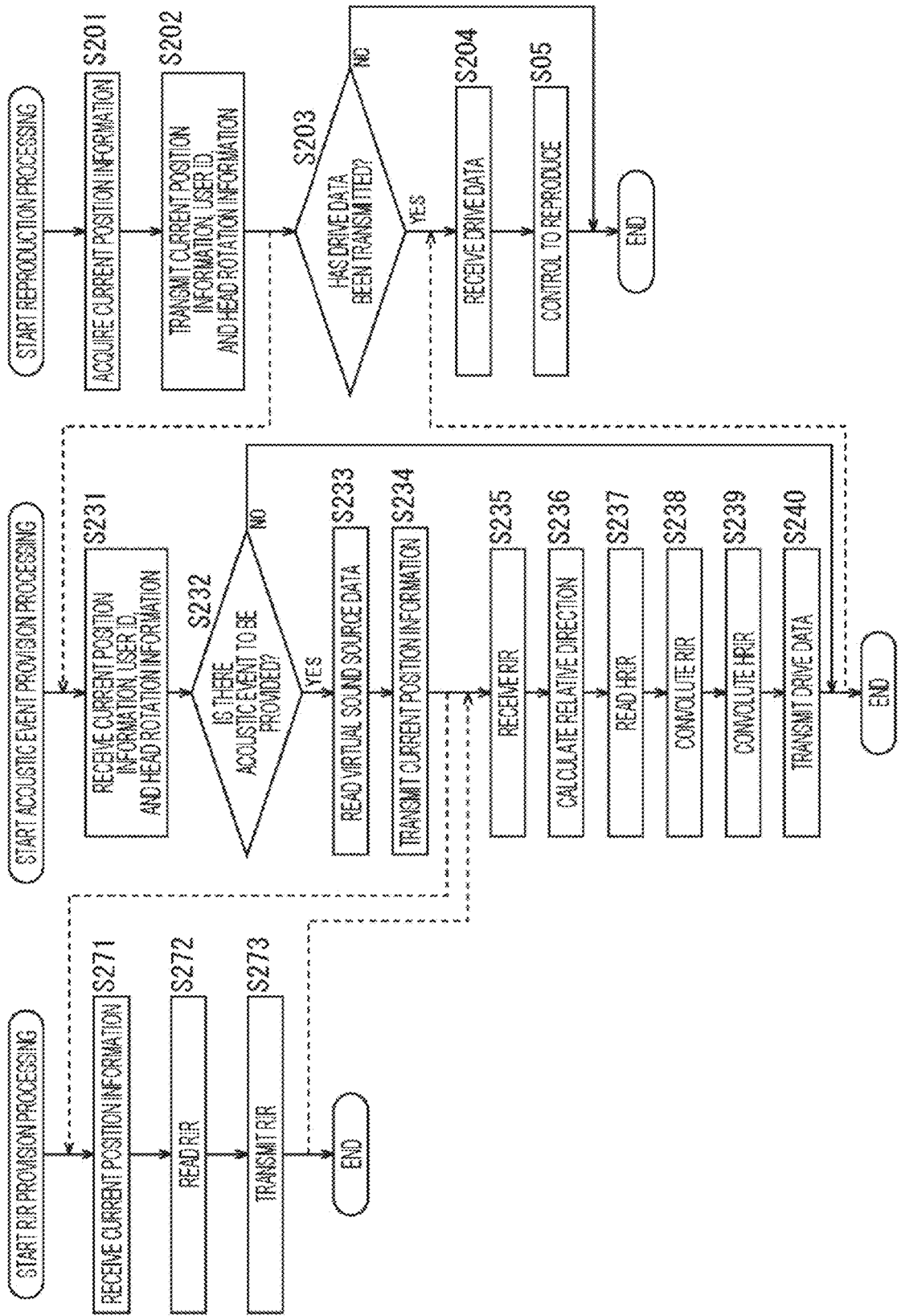
FIG. 11 is a flowchart describing reproduction processing, RIR provision processing, and acoustic event provision processing.

Furthermore, for example, the signal processing apparatus 11, the acoustic event provision server 13, and the RIR server 14 perform the processing illustrated in FIG. 11 to reproduce the acoustic event.

Hereinafter, the reproduction processing by the signal processing apparatus 11, the RIR provision processing by the RIR server 14, and the acoustic event provision processing by the acoustic event provision server 13 will be described with reference to the flowchart of FIG. 11.

When the signal processing apparatus 11 starts the reproduction processing, the control unit 36 acquires in step S201 the current position information from the current position acquisition unit 32.

Furthermore, the control unit 36 reads the user ID of the user from the recording unit 34, and acquires the head rotation information from the rotation detection unit 51 of the reproduction apparatus 12.

The control unit 36 supplies the thus obtained current position information, the user ID, and the head rotation information to the communication unit 31.

In step S202, the communication unit 31 transmits, to the acoustic event provision server 13, the current position information, the user ID, and the head rotation information supplied from the control unit 36.

Then, the acoustic event provision server 13 starts the acoustic event provision processing, and performs the processing of step S231.

That is, in step S231, the communication unit 71 receives (acquires) and supplies, to the control unit 72, the current position information, the user ID, and the head rotation information transmitted from the signal processing apparatus 11.

Therefore, the communication unit 71 acquires, from the signal processing apparatus 11, the current position information indicating the current position of the signal processing apparatus 11 that is the presentation destination of the acoustic event (virtual sound source), the user ID indicating the user of the presentation destination, and the head rotation information indicating the rotation direction of the head of the user.

In step S232, the control unit 72 determines whether or not there is an acoustic event to be provided to the user indicated by the user ID, on the basis of the current position information and the user ID supplied from the communication unit 71. In step S232, processing similar to that in step S122 in FIG. 9 is performed.

In a case where it is determined in step S232 that there is no acoustic event to be provided to the user, the acoustic event is not provided, and the acoustic event provision processing ends. In this case, a notification indicating that there is no acoustic event to be provided may be transmitted from the acoustic event provision server 13 to the signal processing apparatus 11.

On the other hand, in a case where it is determined in step S232 that there is an acoustic event to be provided to the user, the control unit 72 reads, from the recording unit 73, in step S233, the virtual sound source data and the virtual sound source position information of the acoustic event to be provided to the user.

Furthermore, the control unit 72 supplies the current position information received in step S231 to the communication unit 71, and instructs transmission to the RIR server 14.

In step S234, the communication unit 71 transmits, to the RIR server 14, the current position information supplied from the control unit 72.

Then, the RIR server 14 performs the processing of steps S271 to S273, and transmits the RIR corresponding to the current position information to the acoustic event provision server 13. That is, the RIR server 14 performs the processing of steps S271 to S273 as the RIR provision processing.

Note that the processing in steps S271 to S273 is similar to the processing in steps S91 to S93 in FIG. 9, and thus the description thereof will be omitted.

In step S235, the communication unit 71 receives and supplies, to the control unit 72, the RIR transmitted from the RIR server 14.

Therefore, the communication unit 71 supplies (transmits) the current position information to the RIR server 14, thereby acquiring, from the RIR server 14, the RIR according to the current position indicated by the current position information.

Note that, here, an example in which the acoustic event provision server 13 acquires the RIR from the RIR server 14 will be described, but the signal processing apparatus 11 may acquire the RIR.

In such a case, for example, the signal processing apparatus 11 transmits the current position information to the RIR server 14 in step S202, and thereafter, the communication unit 31 receives the RIR transmitted from the RIR server 14. Furthermore, the communication unit 31 transmits, to the acoustic event provision server 13, the RIR received from the RIR server 14 in this manner.

When the processing of step S235 is performed and the RIR is received, thereafter the processing of steps S236 to S239 is performed to generate drive data.

Note that the processing in steps S236 to S239 is similar to the processing in steps S56 to S59 in FIG. 9, and therefore the description thereof will be omitted.

However, in step S236, the relative direction is calculated by the relative direction calculation unit 37 on the basis of the current position information and the head rotation information received in step S231 and the virtual sound source position information read in step S233.

Furthermore, in step S237, the control unit 72 reads the HRIR corresponding to the relative direction from the recording unit 73. Moreover, in step S238, the RIR convolution processing unit 38 convolves the virtual sound source data read in step S233 and the RIR received in step S235.

When drive data is generated in this manner, the control unit 72 supplies the generated drive data to the communication unit 71.

In step S240, the communication unit 71 transmits, to the signal processing apparatus 11, the drive data supplied from the control unit 72, and the acoustic event provision processing ends. Therefore, the drive data is supplied from the communication unit 71 to the signal processing apparatus 11, which is the presentation destination of the acoustic event (virtual sound source).

Furthermore, the signal processing apparatus 11 performs the processing of step S203 after step S202.

That is, in step S203, the control unit 36 determines whether or not the drive data has been transmitted from the acoustic event provision server 13.

In a case where it is determined in step S203 that the drive data has not been transmitted, there is no acoustic event to be presented to the user, and therefore the reproduction processing ends.

On the other hand, in a case where it is determined in step S203 that the drive data has been transmitted, the communication unit 31 receives, in step S204, and supplies, to the control unit 36, the drive data transmitted from the acoustic event provision server 13. Furthermore, the control unit 36 supplies, to the reproduction control unit 40, the drive data supplied from the communication unit 31.

In step S205, the reproduction control unit 40 supplies, to the reproduction unit 52 of the reproduction apparatus 12, the drive data supplied from the control unit 36 to drive the reproduction unit 52 to reproduce the acoustic event based on the drive data.

When the acoustic event is reproduced in this manner, the reproduction processing ends.

As described above, the acoustic event provision server 13 receives the current position information and the head rotation information from the signal processing apparatus 11, and acquires the RIR from the RIR server 14 to generate drive data. Furthermore, the signal processing apparatus 11 receives the drive data from the acoustic event provision server 13 and causes the acoustic event to be reproduced.

Also in a case where the acoustic event provision server 13 generates drive data in this manner, it is possible to realize more realistic acoustic presentation similar to that in the case of the acoustic reproduction system illustrated in FIG. 7.

Other Modifications

Note that while FIG. 10 illustrates an example in which the acoustic event provision server 13 generates the drive data, the RIR server 14 may generate the drive data.

In such a case, the control unit 82 of the RIR server 14 is provided with the relative direction calculation unit 37 to the HRIR convolution processing unit 39.

Then, the communication unit 81 of the RIR server 14 acquires (receives) current position information and a user ID from the signal processing apparatus 11, transmits (supplies) the current position information and the user ID to the acoustic event provision server 13, and acquires virtual sound source data from the acoustic event provision server 13.

Furthermore, another server on the cloud different from the acoustic event provision server 13 and the RIR server 14 may acquire the current position information, the RIR, and the virtual sound source data from the signal processing apparatus 11, the acoustic event provision server 13, and the RIR server 14 to generate the drive data.

In the meantime, in preparing the RIR at each position of the target area, on the basis of an image uploaded by the user or the like, for example, the RIR at the imaging position of the image may be estimated.

In such a case, for example, the user or the like transmits (uploads) and control to record position information indicating a predetermined position in the target area and an imaged image imaged at the predetermined position in association with each other from the signal processing apparatus 11 or the like to a predetermined server.

Here, for example, an imaged image associated with position information is posted on a social networking service (SNS), a web page, or the like managed by a predetermined server.

The RIR server 14 accesses a predetermined server by the communication unit 81, and acquires and supplies, to the control unit 82, the imaged image and the position information associated with the imaged image.

Then, the control unit 82 performs analysis processing on the imaged image, and estimates the RIR at the position where the imaged image is imaged.

Here, the material constituting a real space such as an urban area or a room including an imaging position of an imaged image, the size of the real space, or the like is estimated by analysis processing, for example, and the RIR is estimated on the basis of the estimation result. Specifically, for example, in a case where the imaging position of the imaged image is in a room, the material of the wall or floor constituting the room, the size of the room, and the like are estimated, and the RIR is estimated from the estimation result.

When the RIR is estimated in this manner, the control unit 82 sets the position information associated with the imaged image used for the estimation of the RIR as the transfer characteristic position information as it is, and causes the recording unit 83 to record the obtained RIR and the transfer characteristic position information in association with each other.

In addition, for example, in a case where the target area is a movie theater or the like, login information of the user to the acoustic event provision server 13 managed by an administrator or the like of the movie theater, specifically, information such as a seat of the user or a position of the movie theater may be used as the current position information.

Furthermore, for example, in a case where a commercial facility such as a theme park is included in the target area and an RIR is prepared for the commercial facility, when information indicating that the user has passed through the gate of the commercial facility can be obtained, the information may be used to acquire the current position information. That is, for example, in a case where it is confirmed that the user has passed through the gate of the commercial facility, in other words, in a case where it is confirmed that the user is present in the commercial facility, the position of the commercial facility may be set as the current position of the user.

<Configuration Example of Computer>

In the meantime, the series of processing described above can be executed by hardware or can be executed by software. In a case where the series of processing is executed by software, a program constituting the software is installed into a computer. Here, the computer includes a computer incorporated in dedicated hardware and, for example, a general-purpose personal computer capable of executing various functions by installing various programs.

Figure 12:
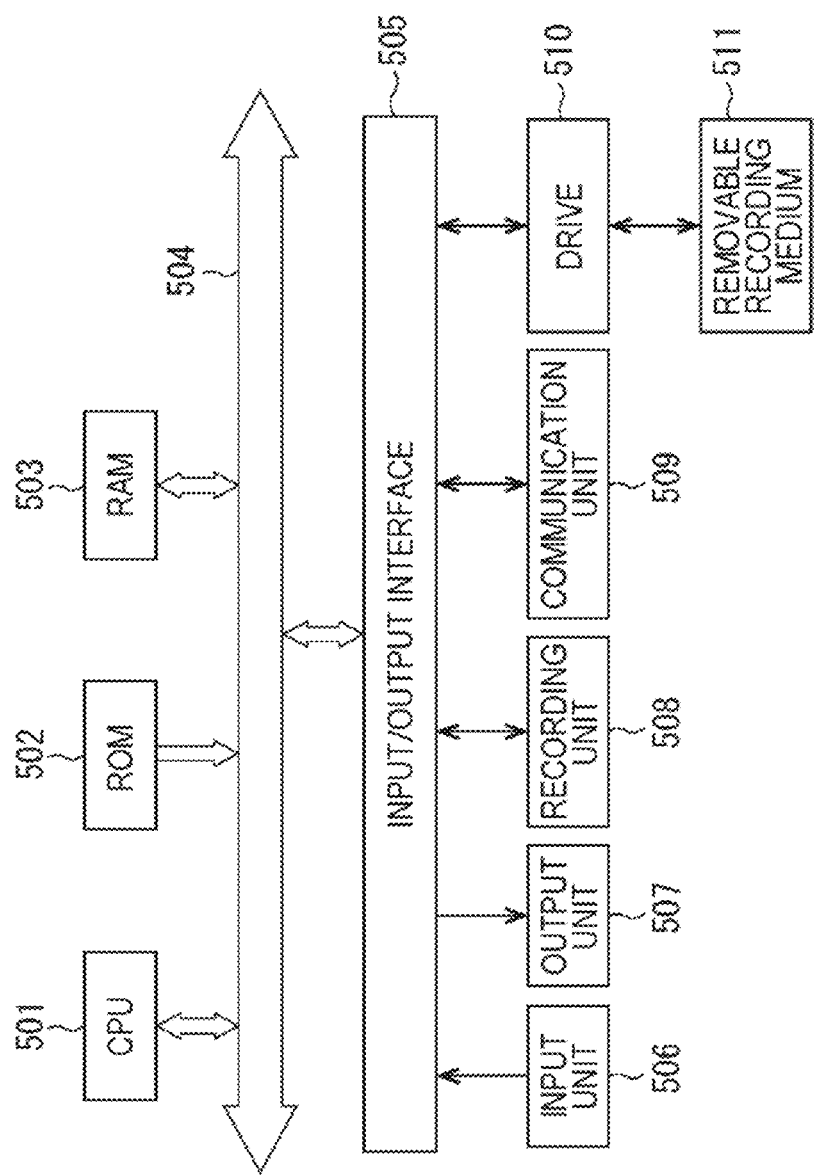
FIG. 12 is a diagram illustrating a configuration example of a computer.

FIG. 12 is a block diagram illustrating a configuration example of hardware of a computer that executes the above-described series of processing by a program.

In the computer, a central processing unit (CPU) 501, a read only memory (ROM) 502, and a random access memory (RAM) 503 are interconnected by a bus 504.

Moreover, an input/output interface 505 is connected to the bus 504. An input unit 506, an output unit 507, a recording unit 508, a communication unit 509, and a drive 510 are connected to the input/output interface 505.

The input unit 506 includes a keyboard, a mouse, a microphone, an imaging element, and the like. The output unit 507 includes a display, a speaker, and the like. The recording unit 508 includes a hard disk, a nonvolatile memory, and the like. The communication unit 509 includes a network interface and the like. The drive 510 drives a removable recording medium 511 such as a magnetic disk, an optical disk, a magneto-optical disk, or a semiconductor memory.

When the CPU 501 loads a program recorded in the recording unit 508, for example, to the RAM 503 via the input/output interface 505 and the bus 504, and executes the program, the computer configured as described above performs the series of processing described above.

The program executed by the computer (CPU 501) can be recorded and provided in the removable recording medium 511 as a package medium, for example. Furthermore, the program can be provided via a wired or wireless transmission medium such as a local area network, the Internet, and digital satellite broadcasting.

By mounting the removable recording medium 511 to the drive 510, the computer can install the program into the recording unit 508 via the input/output interface 505. Furthermore, the program can be received by the communication unit 509 via a wired or wireless transmission medium, and installed in the recording unit 508. Other than that, the program can be installed in advance in the ROM 502 or the recording unit 508.

Note that the program executed by the computer may be a program in which processing is performed in time series along the order explained in the present description, or may be a program in which processing is performed in parallel or at a necessary timing such as when a call is made.

Furthermore, the embodiment of the present technology is not limited to the embodiments described above, and various modifications can be made in a scope without departing from the gist of the present technology.

For example, the present technology can have a configuration of cloud computing in which one function is shared by a plurality of apparatuses via a network and is processed in cooperation.

Furthermore, each step explained in the above-described flowcharts can be executed by one apparatus or executed by a plurality of apparatuses in a shared manner.

Moreover, in a case where one step includes a plurality of processing, the plurality of processing included in the one step can be executed by one apparatus or executed by a plurality of apparatuses in a shared manner.

Moreover, the present technology can have the following configurations.

(1)
A signal processing apparatus including
an acoustic transfer characteristic convolution processing unit that convolves an acoustic transfer characteristic according to a current position of a presentation destination of a virtual sound source among the acoustic transfer characteristic associated with each position in a space and virtual sound source data of the virtual sound source.

(2)
The signal processing apparatus according to (1), further including
an acquisition unit that acquires the acoustic transfer characteristic according to the current position by supplying information indicating a position of the signal processing apparatus as current position information indicating the current position.

(3)
The signal processing apparatus according to (2), in which
the acquisition unit acquires the virtual sound source data according to the current position on the basis of the current position information.

(4)
The signal processing apparatus according to (3), further including
a control unit that controls to display information indicating an arrangement position of the virtual sound source present around the current position.

(5)
The signal processing apparatus according to (4), in which
information indicating the arrangement position is map information.

(6)
The signal processing apparatus according to (1), further including
an acquisition unit that acquires current position information indicating the current position.

(7)
The signal processing apparatus according to (6), in which
the acquisition unit acquires the acoustic transfer characteristic from a server.

(8)
The signal processing apparatus according to (6) or (7), in which
the acquisition unit acquires the acoustic transfer characteristic according to the current position on the basis of the current position information.

(9)
The signal processing apparatus according to (6), in which
the acquisition unit acquires the virtual sound source data from a server.

(10)
The signal processing apparatus according to any one of (6) to (9), in which
the acquisition unit acquires the virtual sound source data according to the current position on the basis of the current position information.

(11)
The signal processing apparatus according to any one of (6) to (10), in which
the acquisition unit supplies, to the presentation destination, audio data obtained by convolution of the acoustic transfer characteristic and the virtual sound source data.

(12)
The signal processing apparatus according to (11), in which
the acquisition unit supplies the audio data to the presentation destination in a case where a user of the presentation destination satisfies a presentation condition.

(13)
The signal processing apparatus according to any one of (1) to (12), further including
a head-related transfer function convolution processing unit that convolves audio data obtained by convolution of the acoustic transfer characteristic and the virtual sound source data and a head-related transfer function according to an arrangement position of the virtual sound source.

(14)
The signal processing apparatus according to (13), in which
the head-related transfer function convolution processing unit convolves the audio data and the head-related transfer function selected on the basis of the arrangement position of the virtual sound source, the current position of the presentation destination, and a rotation direction of a head of a user of the presentation destination.

(15)
A signal processing method including,
by a signal processing apparatus,
convolving an acoustic transfer characteristic according to a current position of a presentation destination of a virtual sound source among the acoustic transfer characteristic associated with each position in a space and virtual sound source data of the virtual sound source.

(16)
A program that causes a computer to execute processing including a step of
convolving an acoustic transfer characteristic according to a current position of a presentation destination of a virtual sound source among the acoustic transfer characteristic associated with each position in a space and virtual sound source data of the virtual sound source.

(17)
An acoustic reproduction apparatus including:
a reception unit that receives, from an external apparatus, audio data obtained by convolving an acoustic transfer characteristic according to a current position of a presentation destination of a virtual sound source among the acoustic transfer characteristic associated with each position in a space and virtual sound source data of the virtual sound source; and
a reproduction unit that reproduces a sound based on the audio data received by the reception unit.

REFERENCE SIGNS LIST

11 Signal processing apparatus
12 Reproduction apparatus
13 Acoustic event provision server
14 RIR server
31 Communication unit
32 Current position acquisition unit
33 Display unit
34 Recording unit
36 Control unit
37 Relative direction calculation unit
38 RIR convolution processing unit
39 HRIR convolution processing unit
40 Reproduction control unit

The invention claimed is:

1. A signal processing apparatus comprising:
a communication unit configured to transmit a current position of the signal processing apparatus to a server and obtain an acoustic transfer characteristic from the server, wherein
the server stores a plurality of acoustic transfer characteristics respectively associated with a plurality of positions in a target area,
the acoustic transfer characteristic is selected from among the plurality of acoustic transfer characteristics based on the target area and the current position being one of the plurality of positions for which one of the plurality of acoustic transfer characteristics is stored;
the acoustic transfer characteristic is not sent if the acoustic transfer characteristic associated with the current position is not present; and
an acoustic transfer characteristic convolution processing unit that convolves the acoustic transfer characteristic, which is obtained from the server according to the current position of a presentation destination of a virtual sound source, and virtual sound source data of the virtual sound source, which is configured to be broadcast to the plurality of positions.

2. The signal processing apparatus according to claim 1, further comprising
an acquisition unit that acquires the acoustic transfer characteristic according to the current position by supplying information indicating a position of the signal processing apparatus as current position information indicating the current position.

3. The signal processing apparatus according to claim 2, wherein
the acquisition unit acquires the virtual sound source data according to the current position on a basis of the current position information.

4. The signal processing apparatus according to claim 3, further comprising
a control unit that controls to display information indicating an arrangement position of the virtual sound source present around the current position.

5. The signal processing apparatus according to claim 4, wherein
information indicating the arrangement position is map information.

6. The signal processing apparatus according to claim 1, further comprising
an acquisition unit that acquires current position information indicating the current position.

7. The signal processing apparatus according to claim 6, wherein
the acquisition unit acquires the acoustic transfer characteristic from the server.

8. The signal processing apparatus according to claim 6, wherein
the acquisition unit acquires the acoustic transfer characteristic according to the current position on a basis of the current position information.

9. The signal processing apparatus according to claim 6, wherein
the acquisition unit acquires the virtual sound source data from the server.

10. The signal processing apparatus according to claim 6, wherein
the acquisition unit acquires the virtual sound source data according to the current position on a basis of the current position information.

11. The signal processing apparatus according to claim 6, wherein
the acquisition unit supplies, to the presentation destination, audio data obtained by convolution of the acoustic transfer characteristic and the virtual sound source data.

12. The signal processing apparatus according to claim 11, wherein
the acquisition unit supplies the audio data to the presentation destination in a case where a user of the presentation destination satisfies a presentation condition.

13. The signal processing apparatus according to claim 1, further comprising
a head-related transfer function convolution processing unit that convolves audio data obtained by convolution of the acoustic transfer characteristic and the virtual sound source data and a head-related transfer function according to an arrangement position of the virtual sound source.

14. The signal processing apparatus according to claim 13, wherein
the head-related transfer function convolution processing unit convolves the audio data and the head-related transfer function selected on a basis of the arrangement position of the virtual sound source, the current position of the presentation destination, and a rotation direction of a head of a user of the presentation destination.

15. A signal processing method comprising, by a signal processing apparatus, communicating with a server via a network to transmit a current position of the signal processing apparatus and obtaining an acoustic transfer characteristic from the server, wherein the server stores a plurality of acoustic transfer characteristics respectively associated with a plurality of positions in a target area, the acoustic transfer characteristic is selected from among the plurality of acoustic transfer characteristics based on the target area and the current position being one of the plurality of positions for which one of the plurality of acoustic transfer characteristics is stored;

the acoustic transfer characteristic is not sent if the acoustic transfer characteristic associated with the current position is not present; and convolving an acoustic transfer characteristic, which is obtained from the server according to the current position of a presentation destination of a virtual sound source, and virtual sound source data of the virtual sound source, which is configured to be broadcast to the plurality of positions.

16. A non-transitory computer-readable medium configured to store a program that, when executed by a signal processing apparatus, causes the signal processing apparatus to execute processing including communicating with a server via a network to transmit a current position of the signal processing apparatus and obtaining an acoustic transfer characteristic from the server, wherein the server stores a plurality of acoustic transfer characteristics respectively associated with a plurality of positions in a target area, the acoustic transfer characteristic is selected from among the plurality of acoustic transfer characteristics based on the target area and the current position being one of the plurality of positions for which one of the plurality of acoustic transfer characteristics is stored;

the acoustic transfer characteristic is not sent if the acoustic transfer characteristic associated with the current position is not present; and convolving an acoustic transfer characteristic, which is obtained from the server according to the current position of a presentation destination of a virtual sound source, and virtual sound source data of the virtual sound source, which is configured to be broadcast to the plurality of positions.

17. An acoustic reproduction apparatus comprising:

a communication unit configured to transmit a current position of the acoustic reproduction apparatus to an external apparatus;

a reception unit that receives, from the external apparatus, audio data obtained by convolving an acoustic transfer characteristic according to the target area and the current position of a presentation destination of a virtual sound source and virtual sound source data of the virtual sound source wherein the acoustic transfer characteristic is not sent if the acoustic transfer characteristic associated with the current position is not present; and a reproduction unit that reproduces a sound based on the audio data received by the reception unit.

18. The signal processing apparatus according to claim 1, further comprising the target area for which the plurality of acoustic transfer characteristics are prepared, comprising the entire world, a specific area such as a city or a district in a city, and a local area such as a specific movie theatre or a theme park.

19. The signal processing method according to claim 15, further comprising the target area for which the plurality of acoustic transfer characteristics are prepared, comprising the entire world, a specific area such as a city or a district in a city, and a local area such as a specific movie theatre or a theme park.

20. The non-transitory computer-readable medium according to claim 16, further comprising the target area for which the plurality of acoustic transfer characteristics are prepared, comprising the entire world, a specific area such as a city or a district in a city, and a local area such as a specific movie theatre or a theme park.

* * * * *